US007219423B2

(12) United States Patent
Johnson et al.

(10) Patent No.: US 7,219,423 B2
(45) Date of Patent: May 22, 2007

(54) MANUFACTURING PROCESS FOR A FLEX CONNECTOR OF AN ELECTRICAL SYSTEM

(75) Inventors: Ross S. Johnson, Jenison, MI (US); Harold R. Wilson, Hudsonville, MI (US); Randy Borgman, Holland, MI (US); Dave Emery, North Muskegon, MI (US); Ronald H. Brown, Holland, MI (US)

(73) Assignee: Haworth, Inc., Holland, MI (US)

( * ) Notice: Subject to any disclaimer, the term of this patent is extended or adjusted under 35 U.S.C. 154(b) by 122 days.

(21) Appl. No.: 11/176,971

(22) Filed: Jul. 7, 2005

(65) Prior Publication Data

US 2006/0035499 A1 Feb. 16, 2006

Related U.S. Application Data

(63) Continuation-in-part of application No. 11/173,935, filed on Jul. 1, 2005, which is a continuation-in-part of application No. 11/036,756, filed on Jan. 14, 2005, now abandoned, which is a continuation of application No. PCT/US03/22278, filed on Jul. 15, 2003.

(60) Provisional application No. 60/396,863, filed on Jul. 15, 2002.

(51) Int. Cl.
*H01R 43/02* (2006.01)

(52) U.S. Cl. ........................... 29/860; 29/857; 29/863; 174/88 R

(58) Field of Classification Search .................. 29/857, 29/860, 863; 174/88 R
See application file for complete search history.

(56) References Cited

U.S. PATENT DOCUMENTS 2,997,521 A * 8/1961 Dahlgren .................... 174/254
3,731,251 A * 5/1973 Sinclair ...................... 439/497
4,173,388 A * 11/1979 Brandeau .................... 439/442
4,313,646 A 2/1982 Millhimes et al.
4,682,840 A * 7/1987 Lockard ...................... 439/874
4,737,117 A * 4/1988 Lockard ...................... 439/92
4,825,540 A 5/1989 Kelly
4,860,447 A * 8/1989 Nicholas et al. .............. 29/863
4,870,227 A * 9/1989 Saen et al. ............. 174/117 FF
4,879,809 A * 11/1989 Nicholas et al. .............. 29/860
5,096,433 A 3/1992 Boundy
5,597,326 A * 1/1997 DeLessert et al. .......... 439/608
5,906,044 A * 5/1999 Fujii et al. ..................... 29/860
5,938,462 A 8/1999 Wilson et al.
5,962,813 A * 10/1999 Shirako et al. ........... 174/88 R (Continued)

FOREIGN PATENT DOCUMENTS

WO WO 2004/057716 A1 7/2004

*Primary Examiner*—Carl J. Arbes
(74) *Attorney, Agent, or Firm*—Flynn, Thiel, Boutell & Tanis, P.C.

(57) ABSTRACT

A modular multi-component power distribution system is provided having a plurality of modular components which includes a bus-bar-like power distribution assembly (PDA), branching connectors, flex connectors, and receptacles. A manufacturing process relates to the manufacture of the flex connectors which have plugs provided on the opposite ends of an intermediate cable section. The intermediate cable section includes multiple conductor wires having opposite ends projecting outwardly of an outer insulative cover or jacket. The plugs are attached to the opposite ends of the cable wherein each plug includes an outer housing and cover, as well as a plurality of multi-prong quad-point electrical terminals. Each terminal is connected to a respective wire and then fitted into an appropriate socket therefore.

20 Claims, 38 Drawing Sheets

U.S. PATENT DOCUMENTS 6,123,562 A 9/2000 King et al.
6,163,958 A 12/2000 Suzuki
6,437,250 B2 * 8/2002 Sugata ........................ 174/135
6,539,617 B2 4/2003 Abe
6,640,425 B1 11/2003 Suzuki
2002/0081894 A1 * 6/2002 Fuerst et al. ................ 439/492
2004/0103531 A1 6/2004 Shirakawa et al.

* cited by examiner

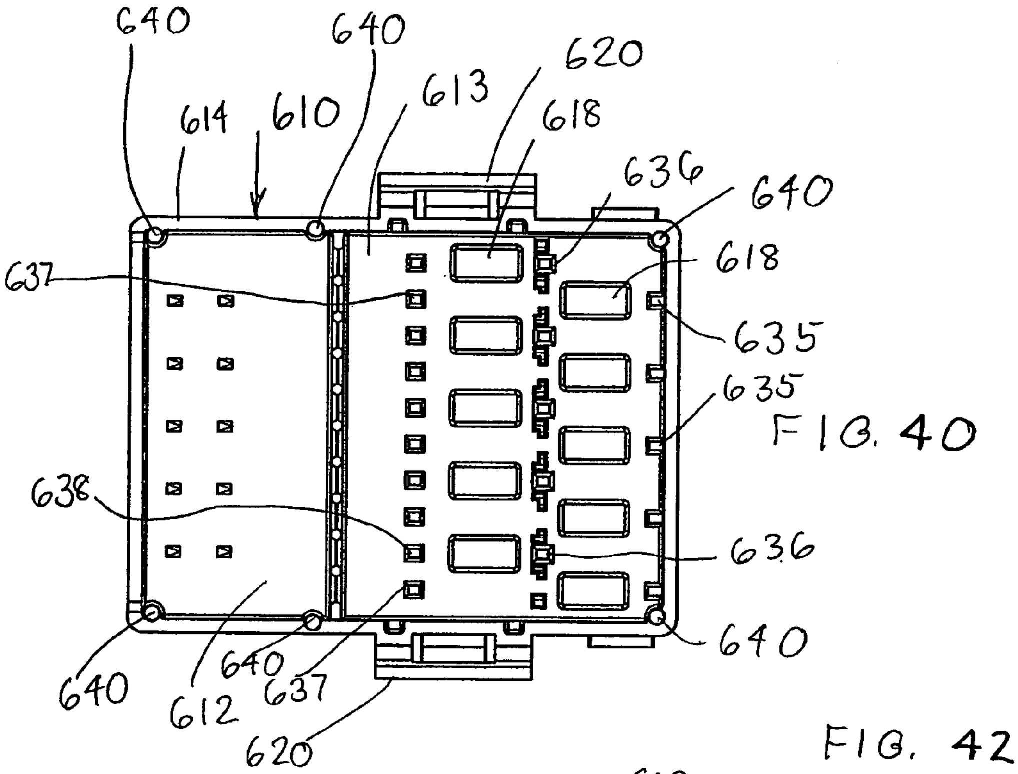
FIG. 40
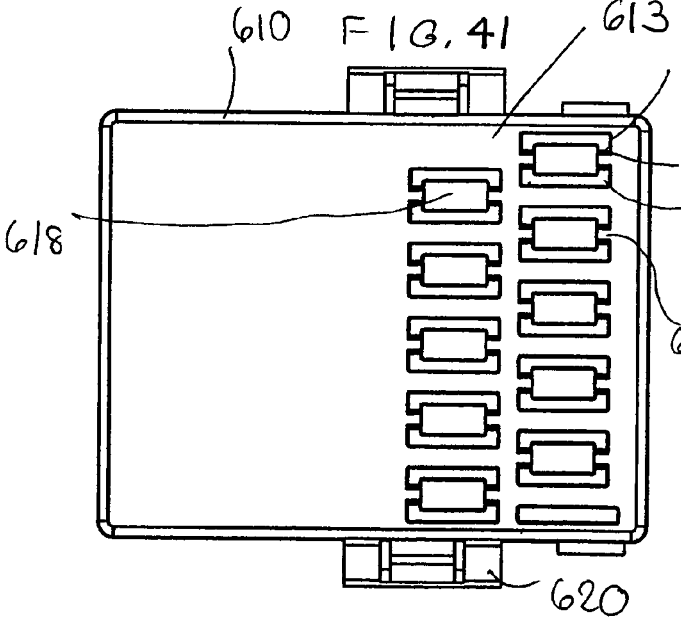
FIG. 41
FIG. 42
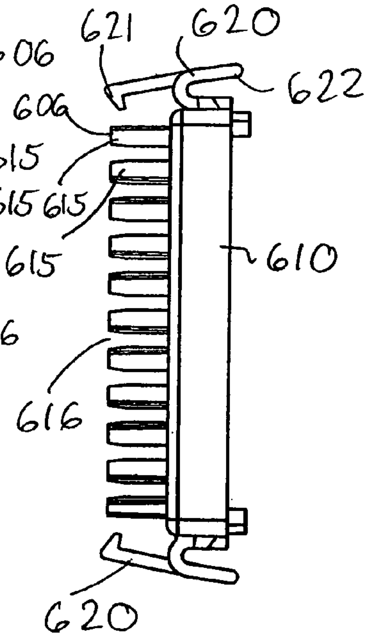

MANUFACTURING PROCESS FOR A FLEX CONNECTOR OF AN ELECTRICAL SYSTEM

CROSS-REFERENCE TO RELATED APPLICATIONS

This application is a continuation-in-part of U.S. patent application Ser. No. 11/173,935, filed Jul. 1, 2005, which is a continuation-in-part of U.S. patent application Ser. No. 11/036,756, filed Jan. 14, 2005, now abandoned which is a continuation of PCT/US03/22278, filed Jul. 15, 2003, which claims priority of U.S. Provisional Patent Application No. 60/396 863, filed Jul. 15, 2002.

FIELD OF THE INVENTION

The invention relates to a modular electrical system for supplying power through an office area and more particularly, to a manufacturing process for manufacturing components of the electrical system.

BACKGROUND OF THE INVENTION

In office buildings, large open areas are often finished off to define an office environment configured for the specific needs of a business. This may be accomplished through combinations of different building systems such as raised floor systems, ceiling systems, wall panel systems, and desking or other furniture systems.

In typical offices, it is necessary to provide data communication systems and power distribution systems to route power and communications circuits throughout multiple workstation areas. One inventive power distribution system comprises modular electrical components which are readily connectable together in multiple configurations depending upon the specific environment in which the power system will be used. The modular components include a solid wire power distribution assembly which forms a solid wire bus, a receptacle and flexible connector cables wherein the system is generally disclosed in Published PCT Application Publication No. WO/2004/057716 A1, which is owned by the assignee hereof, namely, Haworth, Inc. The disclosure of this published PCT application is incorporated herein by reference.

The present invention relates to a manufacturing process for manufacturing components of the afore-mentioned power distribution system. This process relates to the manufacture of flex connectors which have plugs provided on the opposite ends of an intermediate cable section. The intermediate cable section includes multiple conductor wires having opposite ends projecting outwardly of an outer insulative cover or jacket. The plugs are attached to the opposite ends of the cable wherein each plug includes an outer housing and cover, as well as a plurality of multi-prong quad-point electrical terminals. Each terminal is connected to a respective wire and then fitted into an appropriate socket therefore. A preferred cable has ten wires therein wherein each opposite end of the cable has ten terminals connected to the ten wires.

The manufacturing method relates to the process for assembling a flex connector and in particular, the process for connecting the terminals to the opposite ends of the wires and then fitting the terminals into the plug housing.

Other objects and purposes of the invention, and variations thereof, will be apparent upon reading the following specification and inspecting the accompanying drawings.

BRIEF DESCRIPTION OF DRAWINGS

FIG. 40 is a front view of the connector housing.

FIG. 41 is a back view of the connector housing.

FIG. 42 is an end view of the connector housing.

Figure 1:
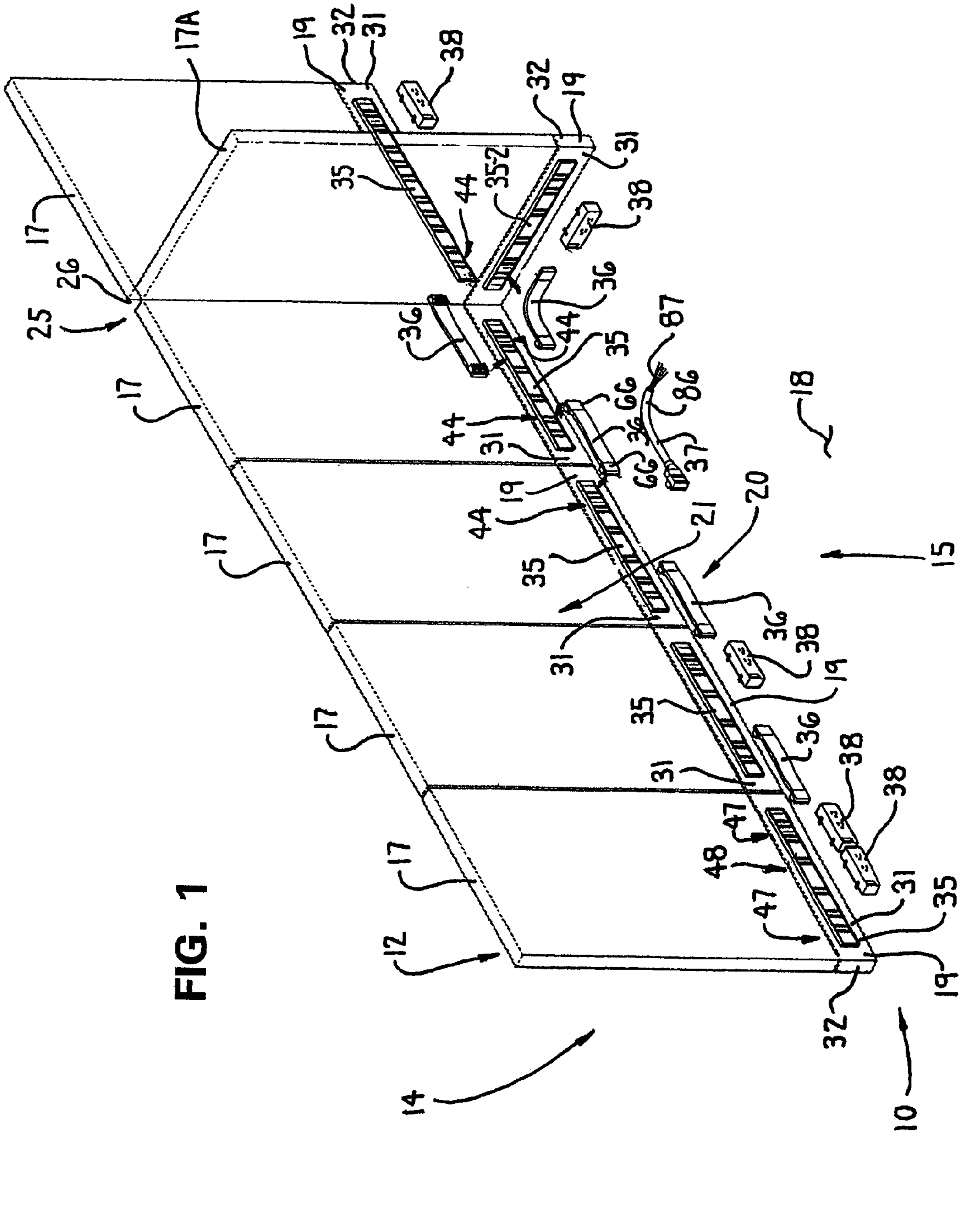
FIG. 1 is a perspective view of a space-dividing wall panel system having modular components of the inventive power distribution system arranged in a bus-bar based configuration.

Certain terminology will be used in the following description for convenience and reference only, and will not be limiting. For example, the words “upwardly”, “downwardly”, “rightwardly” and “leftwardly” will refer to directions in the drawings to which reference is made. The words “inwardly” and “outwardly” will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, components of a modular multi-component power distribution system 10 are illustrated in use within a wall panel system 12. The wall panel system 12 is used to subdivide an open office area 14 into individual subdivided areas 15 such as for walkways, individual work stations and the like.

Generally, the wall panel system 12 includes a plurality of individual space-dividing wall panels 17 that are disposed in load bearing relation on a floor surface 18. Each wall panel 17 includes a horizontally elongate raceway 19 which in the illustrated arrangement is located at the base of the wall panel 17 as indicated by reference arrow 20 but which also may be located at other heights such as beltline height as indicated by reference arrow 21.

One of the wall panels 17A is interconnected with a pair of additional wall panels 17 through a three-way connection 25 with a gap defined therebetween. Each wall panel 17 also includes a raceway cover 31 which encloses the opposite side faces of the raceway 19 while still defining an opening 32 at each opposite end of the panel 17 or 17A. As seen in FIG. 1, a number of the components of the power distribution system 10 are illustrated including a distribution assembly 35 (herein “PDA”) which is formed as a sold wire bus-bar, a flex-type connector 36, a flexible in-feed cable 37 and a plurality of receptacles 38.

Figure 2:
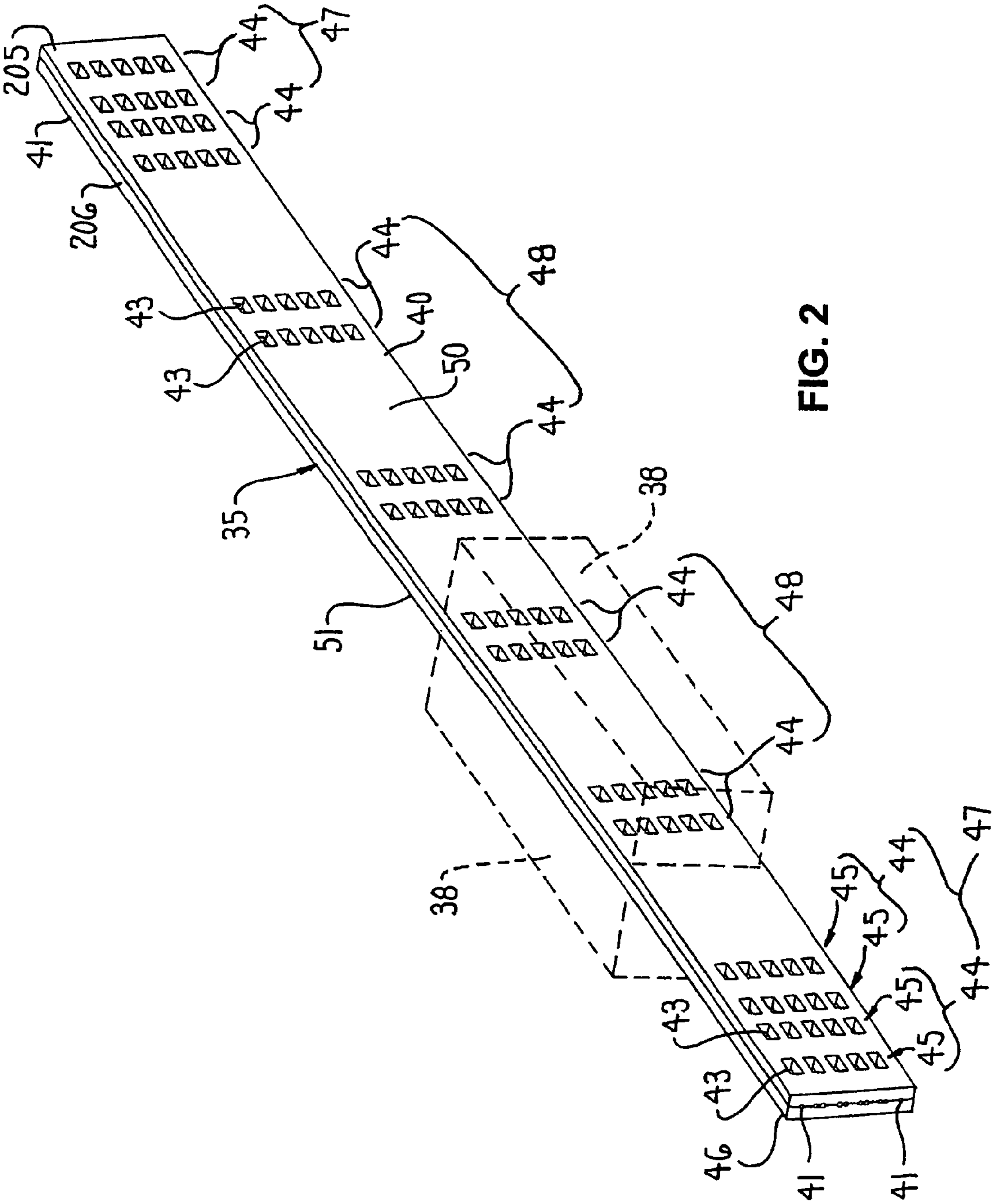
FIG. 2 is a perspective view of a power distribution assembly having receptacles illustrated in phantom outline.

Referring to FIG. 2, one construction of PDA 35 has an extruded construction formed by an insulative casing 40 which has a plurality of parallel, vertically spaced apart electrical conductors 41 which are embedded within the casing 40 and extend longitudinally along the entire length thereof. The conductors 41 define multiple electrical circuits for distribution throughout the office area 14 wherein the conductors 41 define multiple circuits of line, neutral and ground wires.

To provide access to the conductors 41 and permit the connection of system components thereto, the casing 40 is formed with a pre-defined pattern of plug openings 43 wherein the plug openings 43 have portions of the conductors 41 exposed therein. The plug openings 43 are grouped into multiple groups of openings 43 wherein each group 44 is defined by a pair of vertical rows 45 of vertically spaced apart openings 43. Each opening group 44 is adapted to be connected to one of the aforementioned system components, namely a flex connector 36, an in-feed cable 37 or a receptacle 38.

More specifically, two opening groups 44 are provided at each of the opposite ends 46 of the casing 40. Each end pair 47 of groupings 44 is intended to be connected to one of the flex connectors 36, the in-feed cable 37 or the branching connector 39. Each PDA 35 further includes at least one interior pair 48 of groupings 44 to which receptacles 38 may be connected.

In addition to the above components, the power distribution system 10 further includes components for interconnecting each PDA 35 with an adjacent one of the PDAs 35 so as to define continuous electrical circuits extending throughout the office area 14. In a wall panel based arrangement, the primary component is the flex connector 36 which connects serially between a pair of PDAs 35.

Figure 3:
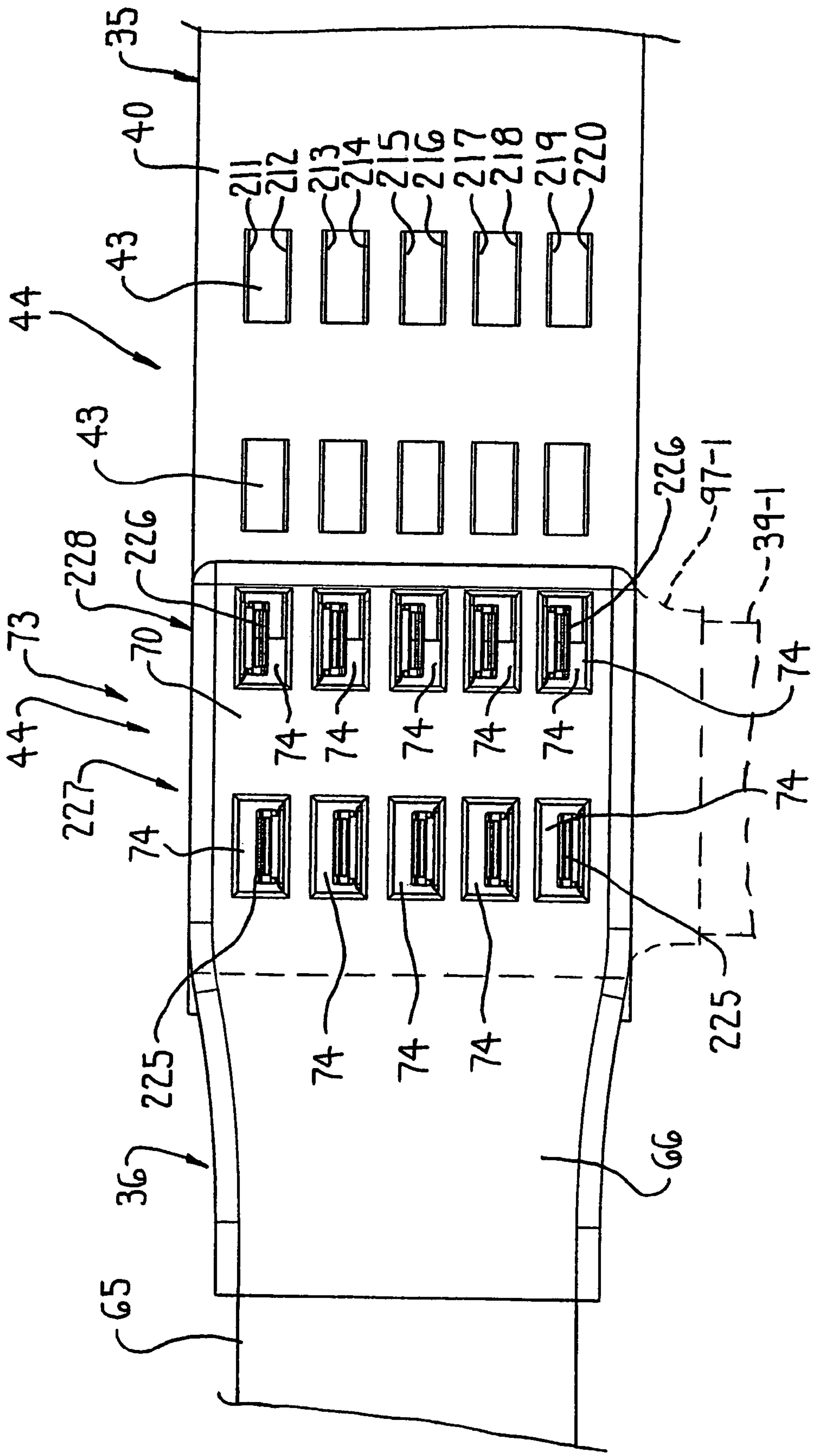
FIG. 3 is a front view illustrating the power distribution assembly interconnected with a connector plug of a flex connector.

Referring to FIG. 3, the flex connector 36 includes a bendable conductor body 65 which terminates at its opposite ends in connector plugs or terminal units 66. The conductor body 65 is relatively rigid in the vertical direction but is bendable in the horizontal direction. The conductor body 65 is formed of an extruded insulative cover in which a plurality of flexible electrical conductor wires extend.

Each connector plug 66 includes an outer terminal or plug housing 67 having an interior face 69 and an exterior face 70. The interior face 69 includes a plurality of plug posts 71 which are arranged in two vertical rows of posts 71. The posts 71 are adapted to be inserted into the openings of a corresponding one of the opening groups 44 in the PDA 35. The posts 71 when engaged with a grouping 44 of plug openings 43 electrically connects the flex connector 36 to the PDA 35 and when the opposite ends of the flex connector 36 are joined to a pair of PDAs 35, the electrical circuits extend continuously from one PDA 35 to a serially adjacent PDA. An alternative cable 39-1 is also illustrated with its plug 97-1 connector thereto.

In addition to the posts 71 on the interior face 69, the exterior face 70 of each connector plug 66 includes a further grouping 73 of plug openings 74. Each contact post 71 includes an exposed contact adapted to be engaged with a conductor of another component of the power distribution system 10 such as the PDA 35. The plug opening 74 also provides access to the same contact of the post 71. Thus, the electrical circuit completed between the connector plug 66 and a system component such as the PDA 35 may be further branched off or extended by plugging an additional system component into the grouping 73 of openings 74.

As to the in-feed cable 37 illustrated in FIG. 1, a length of flexible multi-conductor cabling 86 is provided which has a first end 87 which connects to a power supply. The cabling 86 defines a plurality of electrical circuits and has a cable plug 88 at the free end 89 thereof. For the in-feed cable 37, however, the electrical circuits are supplied to the flex connector 36 as generally illustrated in FIG. 1 and they supply electrical power to the PDA 35 when connected thereto.

Generally with the above-described components, a wide variety of cabling configurations may be constructed in order to accommodate the specific structural limitations of different building systems such as furniture, wall and floor systems.

More particularly, as to the PDA 35 (FIG. 2), the plug openings 43 of each group 44 are arranged in two vertical rows 45. The plug openings 43 have a rectangular shape and project through the entire thickness of the PDA casing 40 so as to open from the opposite casing faces 50 and 51. Each opening 43 is defined vertically by an upper edge 203 and a lower edge 204 (FIG. 4).

The casing 40 is defined by casing halves 205 and 206, which are interconnected together in facing relation to define an interface 207 therebetween. The conductors 41 are sandwiched between the casing halves 205 and 206, as illustrated in FIG. 4 and furthermore, extend longitudinally along the entire length of the PDA 35.

More specifically, as to the conductors 41, the construction of the PDA 35 illustrated in FIG. 2 has ten conductors or wires 41 and is thereby referenced as a ten-wire configuration. The conductors 41 are arranged in vertically spaced relation wherein each pair of conductors 41 has a vertical spacing which corresponds to the vertical size of the opening 43 as defined between the upper and lower edges 203 and 204.

Figure 4:
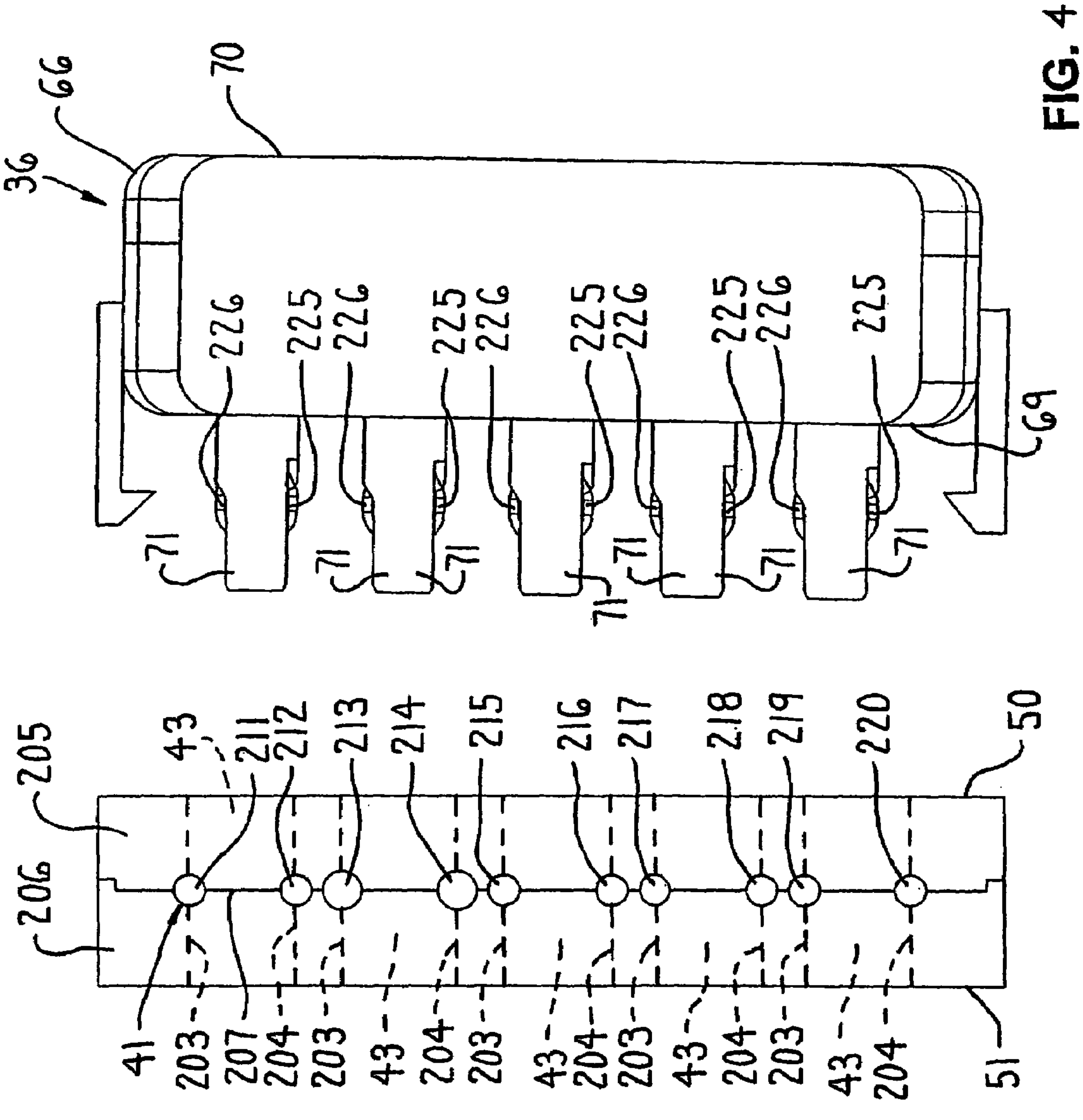
FIG. 4 is an end elevational view of the power distribution assembly and connector plug.

As illustrated in FIG. 4, each opening 43 provides access to an exposed portion of a pair of conductors 41. Specifically, each of the upper and lower edges 203 and 204 has one of the conductors 41 projecting vertically into the open area of the opening 43. The conductors 41 are specifically identified by reference numerals 211–220, with conductors 211, 212 and 215–220 being 12-gauge conventional conductor wire. The conductors 213 and 214 in this illustrated construction are formed of 10-gauge wire to provide a higher capacity, particularly where the conductors 213 and 214 are configured for use as a neutral wire which serves multiple circuits. A more detailed discussion of the assignment of ground, neutral and line wires is discussed in further detail hereinafter. It will be understood that all of the wires may be formed of the same wire gauge, or that different gauges and compositions of wires could be used.

Each of the conductors such as conductors 219 and 220, which are illustrated in phantom outline, extend along the casing 40 with horizontally spaced apart portions of each conductor being exposed along multiple openings 43. In view of the foregoing, each vertical row 45 of openings 43 provides access to all of the conductors 211 to 220.

Figure 5:
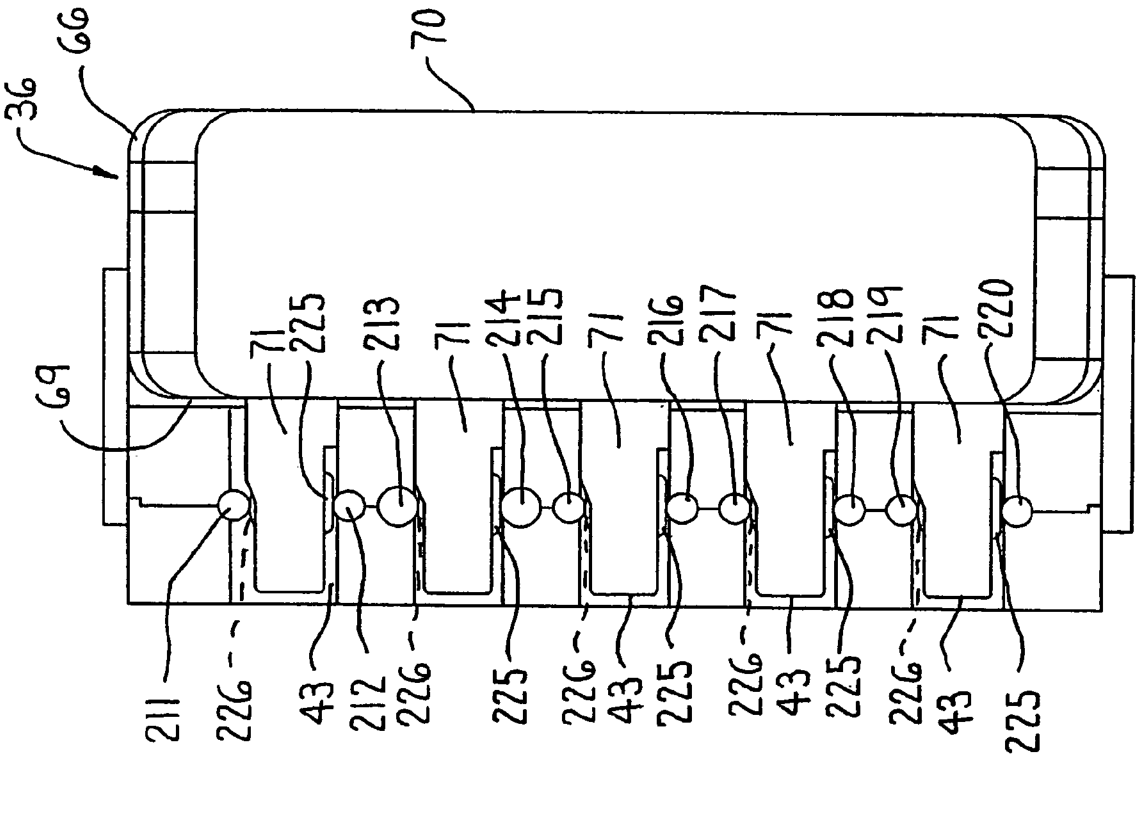
FIG. 5 is an end view of the power distribution assembly and connector plug of FIG. 4 plugged together.

More particularly as to FIGS. 3–5, the connector plug 66 of a flex connector 36 is illustrated therein. The plug 66 includes the grouping 73 of openings 74 in the exterior face 70. Each opening 74 has an electrical contact 225 or 226 accessible therethrough to permit connection of another system component to the flex connector 36 if desired.

As such, when the posts 71 are plugged into the PDA openings 43 as illustrated in FIG. 5, the contact 225 in the uppermost left opening 43 mechanically contacts the conductor 212 to complete an electrical circuit therebetween. Further, the sidewardly adjacent contact 226 contacts the conductor 211 in the uppermost right opening 43. In this manner, all of the contacts 225 and 226 contact all of the conductors 211 to 220.

With this arrangement, the flex connector 36 and the in-feed cable 37 in the identical manner plug into and thereby electrically connect to all of the conductors 211 to 212. The receptacles 38 connect through a similar connection but connect to less than all of the conductors 211 to 220 as will be described herein.

The circuit configuration of FIG. 4 has the ten solid-wire conductors 211–220 configured into four dedicated circuits of one line and one neutral, plus a ground and an isolated ground. Specifically, conductor 211 defines a ground, while conductor 212 serves as an isolated ground. Conductors 213, 215, 217 and 219 serve as line 1, line 2, line 3 and line 4 of the four dedicated circuits, while conductors 214, 216, 218 and 220 serve as neutral 1, neutral 2,neutral 3 and neutral 4. Notably, circuit 1 which comprises line 1 (213) and neutral 1 (214) is a higher capacity circuit since conductors 213 and 214 are 10 gauge wire rather than 12 gauge wire.

Referring to FIGS. 6–10, one manufacturing process for forming the PDAs is readily adaptable to forming the PDAs with different numbers of conductors, such as ten-wire and six-wire systems. Further, the different patterns of openings in these two systems can be readily modified through the manufacturing process to form different numbers of openings and different layouts thereof.

Generally in this process, the PDAs 35 are formed in a continuous length with the pattern of openings 43 being punched depending upon the specific type of PDA being formed, i.e. depending upon the number of opening groups 44 being provided. Thereafter, the length of PDA material is cut to the specific length required. This provides an improved manufacturing process with increased efficiency which thereby reduces the costs associated with the power distribution system 10.

Figure 6:
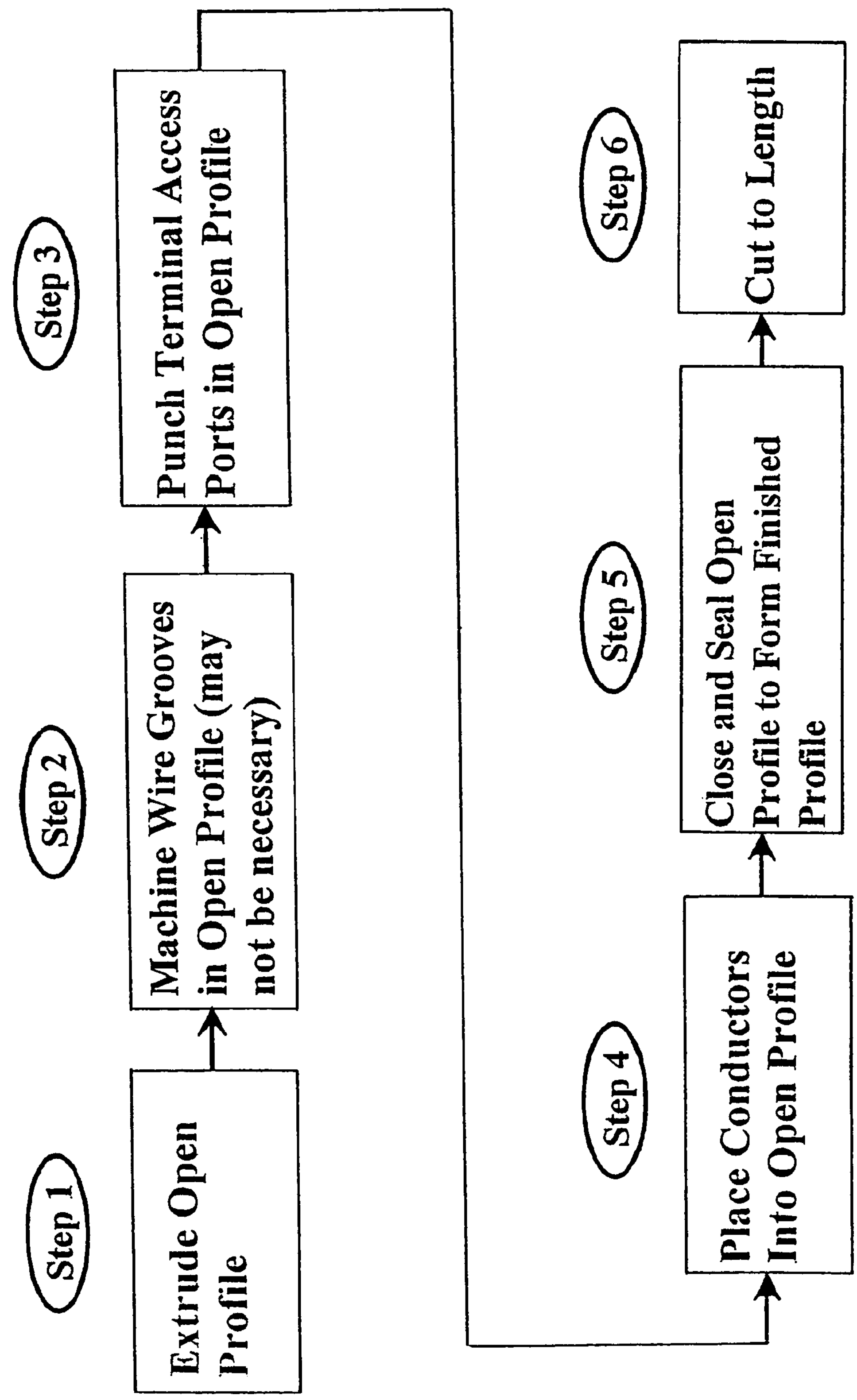
FIG. 6 is a block diagram of a manufacturing process for forming a power distribution assembly.

More specifically, FIG. 6 illustrates the multiple steps involved in the process with FIGS. 7–10 structurally illustrating process steps 1, 2, 4 and 5 respectively.

Figure 7:
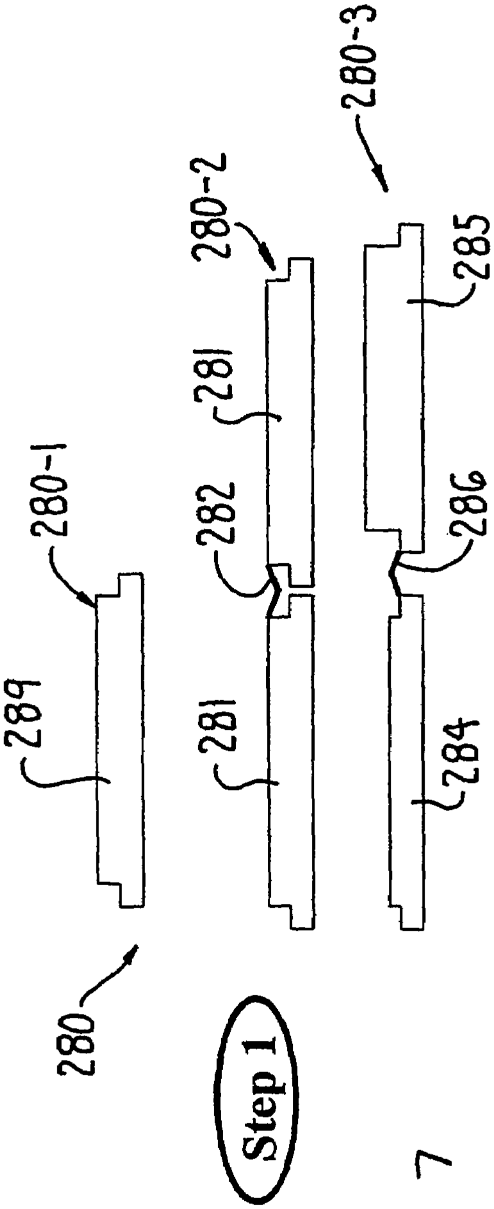
FIG. 7 is a diagrammatic end view of extrusion profiles for step 1 of the manufacturing process.

Referring to FIGS. 6 and 7 which relate to process step 1, this first step involves extruding a profile 280 for the PDA 35 in a continuous extrusion process. The PDA profile 280 is formed of an insulative, relatively rigid material such as plastic. This initial profile 280 may have different configurations including a single common profile 280-1 which is used in pairs to define both halves of the casing 40. This would require two extrusion processes or a single process from which two halves would be formed.

The profile 280-2 could also be formed having two mirror image profile halves 281 which are joined together by a flexible web 282 that defines a hinge about which the profile halves 281 are folded together. The following discussion is directed to profile 280-2 although it is understood that providing two profiles 280-1 is substantially the same as profile 280-2 except that web 282 is not present. Thus, the following discussion of profile 280-2 also applies to profile 280-1.

The profile 280-3 could be formed which has two different half profiles 284 and 285 which also are joined by a flexible web 286. One profile half 285 has a greater thickness.

Figure 8:
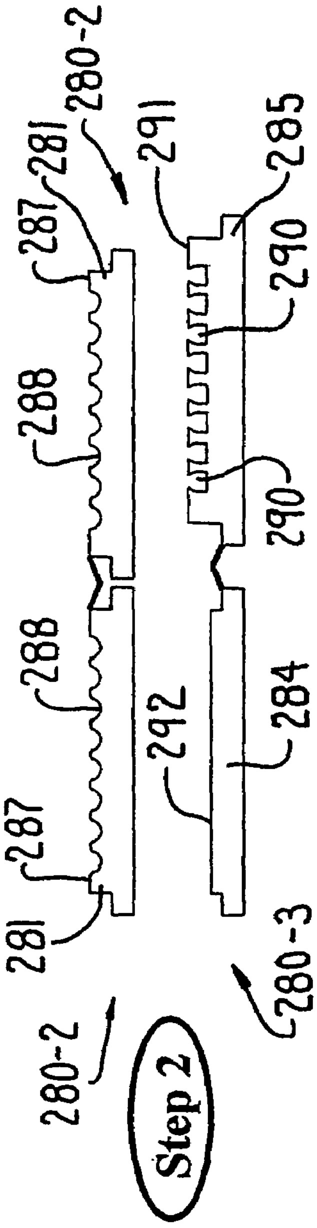
FIG. 8 is a diagrammatic end view of the extrusion profiles during step 2 of the manufacturing process.
Figure 10:
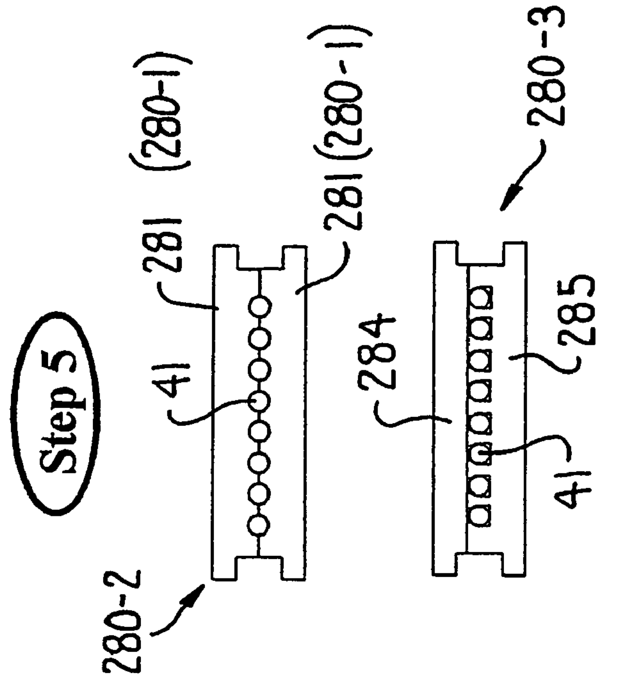
FIG. 10 is a diagrammatic end view of the completed PDA housing during step 5 of the manufacturing process.
Figure 9:
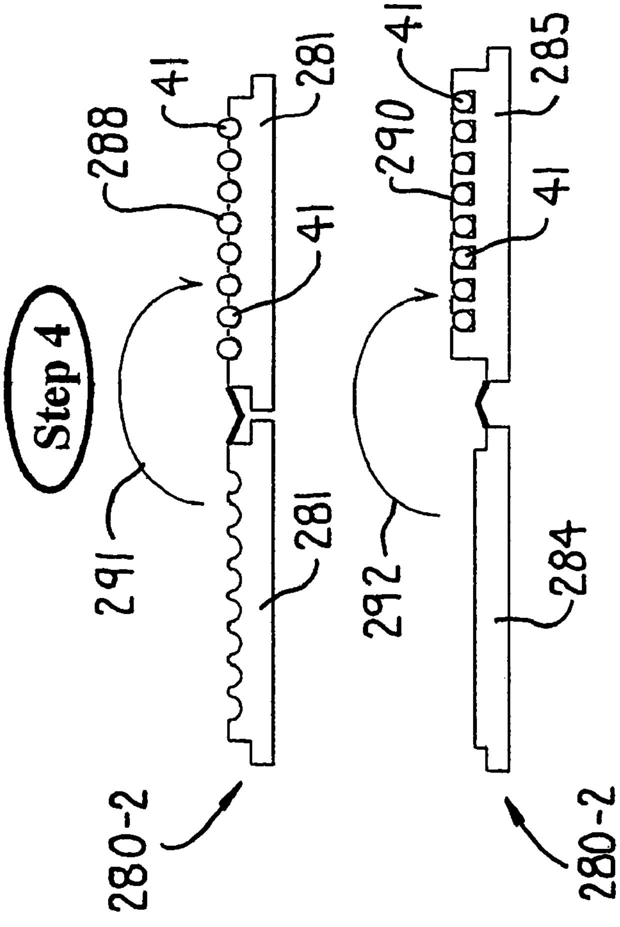
FIG. 9 is a diagrammatic end view of the extrusion profiles during step 4 of the process.

In Step 2, wire or conductor grooves are formed into the profile 280 for accommodating conductors 41. Referring to FIG. 8, the two profile halves 281 have inside faces 287 into which are formed partial-depth grooves 288. The grooves 288 extend longitudinally and are parallel to each other. These same grooves 288 would also be machined into the face 289 of the profile 289.

While the grooves 288 are configured to accommodate half the thickness of a conductor 41, full-depth grooves 290 are provided in parallel relation in the interior face 291 of the profile half 285. The depth of the grooves 290 accommodates the entire thickness of a conductor conductors 41, such that the interior face 292 of the profile half 284 does not require grooves to be machined therein. Further, the grooves 290 have features therein such as a narrow width opening which allows the conductors to be positively secured therein such as by a snap fit.

Step 2 is optional in that the grooves could be and preferably are formed during extrusion, rather than by a separate machining process.

In Step 3, the pattern of openings 43 are punched into the two profiles which make up the PDA. The number of opening groups 44 and the specific arrangement of openings 43 such as in two vertical rows may be varied. For example, groups 44 may be punched to form a PDA 35, which has two interior pairs 48 of groups 44, or another PDA which has more or less interior pairs 48.

In Step 4, the conductors 41 are pre-positioned in the open profile, for example in the grooves 288 of profile 280-2. The empty profile half 281 is hence positioned for folding. For profile 280-3, the conductors 41 are fitted into the grooves 290 with the profile half 284 positioned for folding generally in the direction of arrow 292. In Step 4, the conductors 41 are formed as a continuous length of solid conductor wire which is laid continuously into the groves 288 or 290.

In Step 5, the profile halves are then folded one onto the other at which time the two halves are sealed together to form the finished profile of the PDA. However, the profile still has a continuous length.

In Step 6, the finished profile is cut to length by severing sections from the finished profile to form a finished PDA 35. The finished length of the PDA 35 corresponds to the specific pattern of opening groups 44 punched therein. Thus, the PDAs may be formed from the same process by varying the pattern of groups 44 and severing the finished profile at the length corresponding to the specific pattern applied thereto. Where the conductors are pre-positioned, this severing step cuts through the insulative material as well as the conductors 41. With this manufacturing process, the PDAs 35 may be cost-effectively produced primarily by extruding the components in a continuous operation.

Referring to FIGS. 11–23, a further power distribution system 400 is illustrated therein, which system uses similar components and manufacturing techniques. In particular, the power distribution system 400 includes a power distribution assembly 401, which is formed with the same manufacturing process as that described herein. In particular, the PDA 401 includes an insulated casing 402, which is formed with multiple groups 403 and 404 of openings 405.

Figure 11:
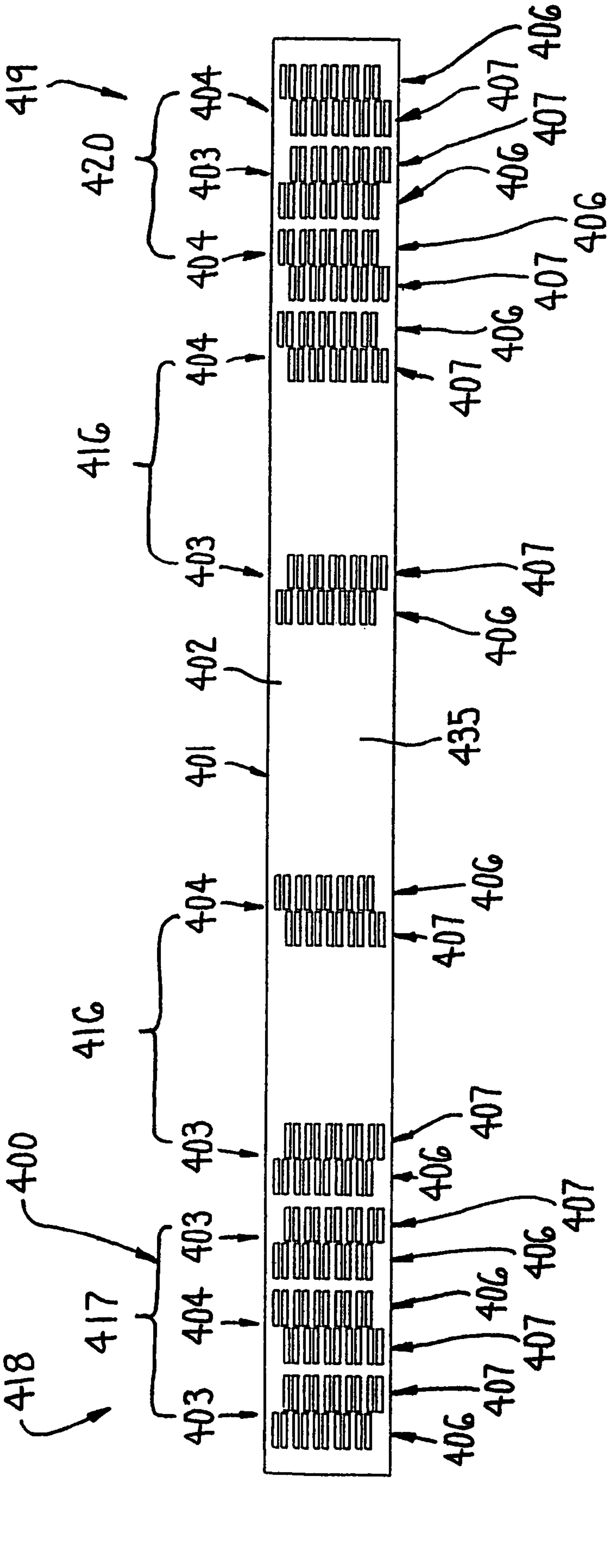
FIG. 11 is a front view of a power distribution assembly of a further power distribution system.

Referring to FIG. 11, each opening group 403 includes a first vertical row 406 of the apertures 405 and a second vertical row 407 of additional apertures 405. The row 406 of apertures 405 is at a higher elevation relative to the second row 407.

The adjacent group 404 of openings is formed similar to the group 403 in that group 404 includes a row 407 of apertures and another row 406 of apertures 405. However, the row 406 is located to the right of row 407 in group 404, which is opposite to the orientation of the rows 406 and 407 in the group 403. Thus, groups 403 and 404 are similar except that the higher elevation row 406 is located on different sides of their respective lower elevation rows 407.

With respect to the individual openings 405 of each row 406 or 407, each vertically adjacent pair of openings 405 is separated by a bridge or land of insulative material 410 which extends laterally across and vertically separates each vertically adjacent pair of openings 405. The openings 405 are formed in the same manner as the openings described previously in that during the extrusion process of the PDA 401, the individual openings 405 are punched into the insulative material of the casing 402.

Figure 12:
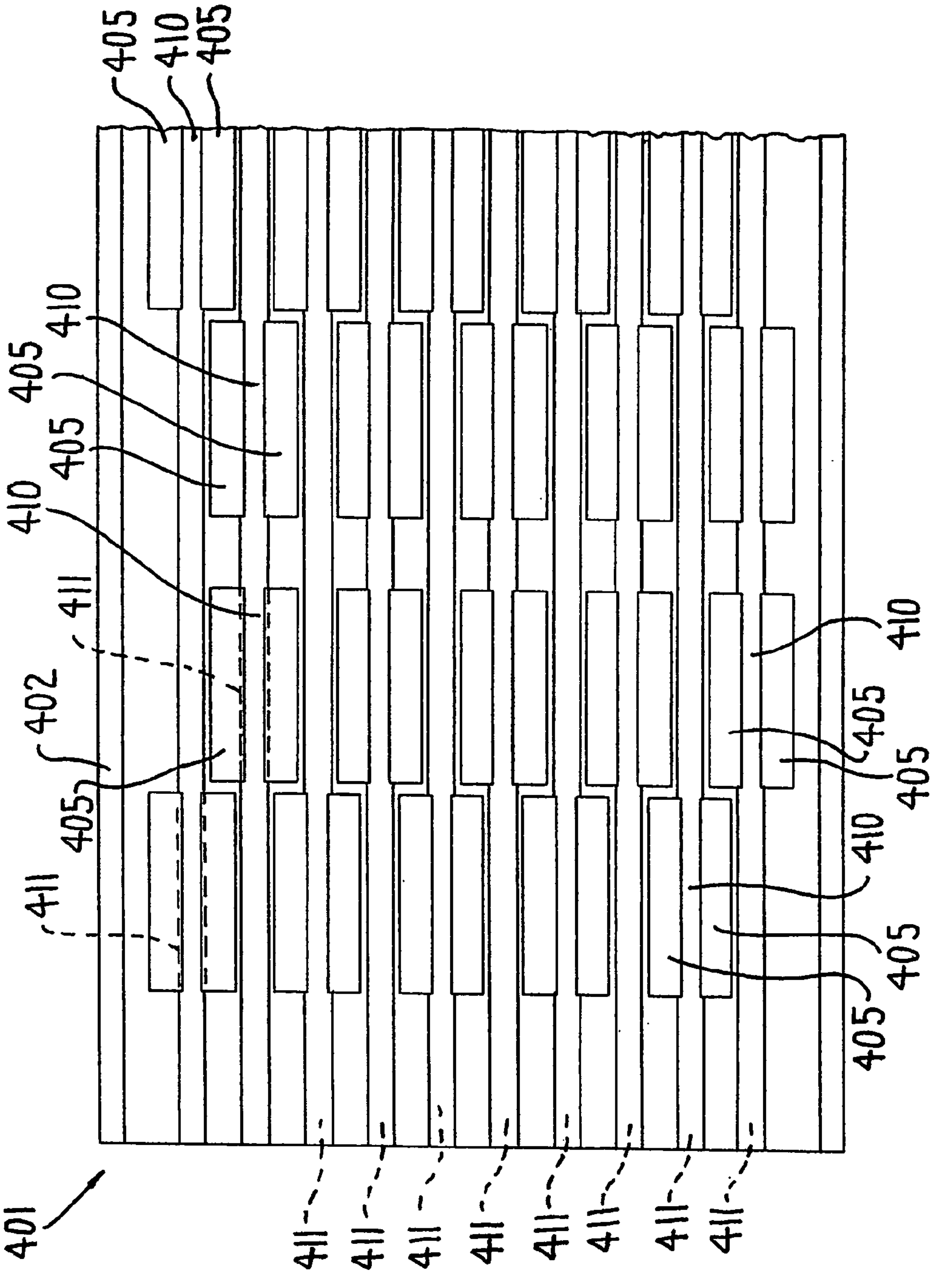
FIG. 12 is a front view of FIG. 11 illustrating conductors extending therethrough.

Referring to FIG. 12, the casing or extruded housing 402 of the PDA 401 is formed internally with a plurality of parallel grooves extending along the entire length of the PDA 401, in which a plurality of conductors 411 are received. Each conductor 411 extends the entire length of the PDA and extends below the bridge 410 disposed between an adjacent pair of openings 405. The conductor 411 for each pair of openings 405 is accessible therethrough and may be accessed through each of said openings 405.

Figure 13:
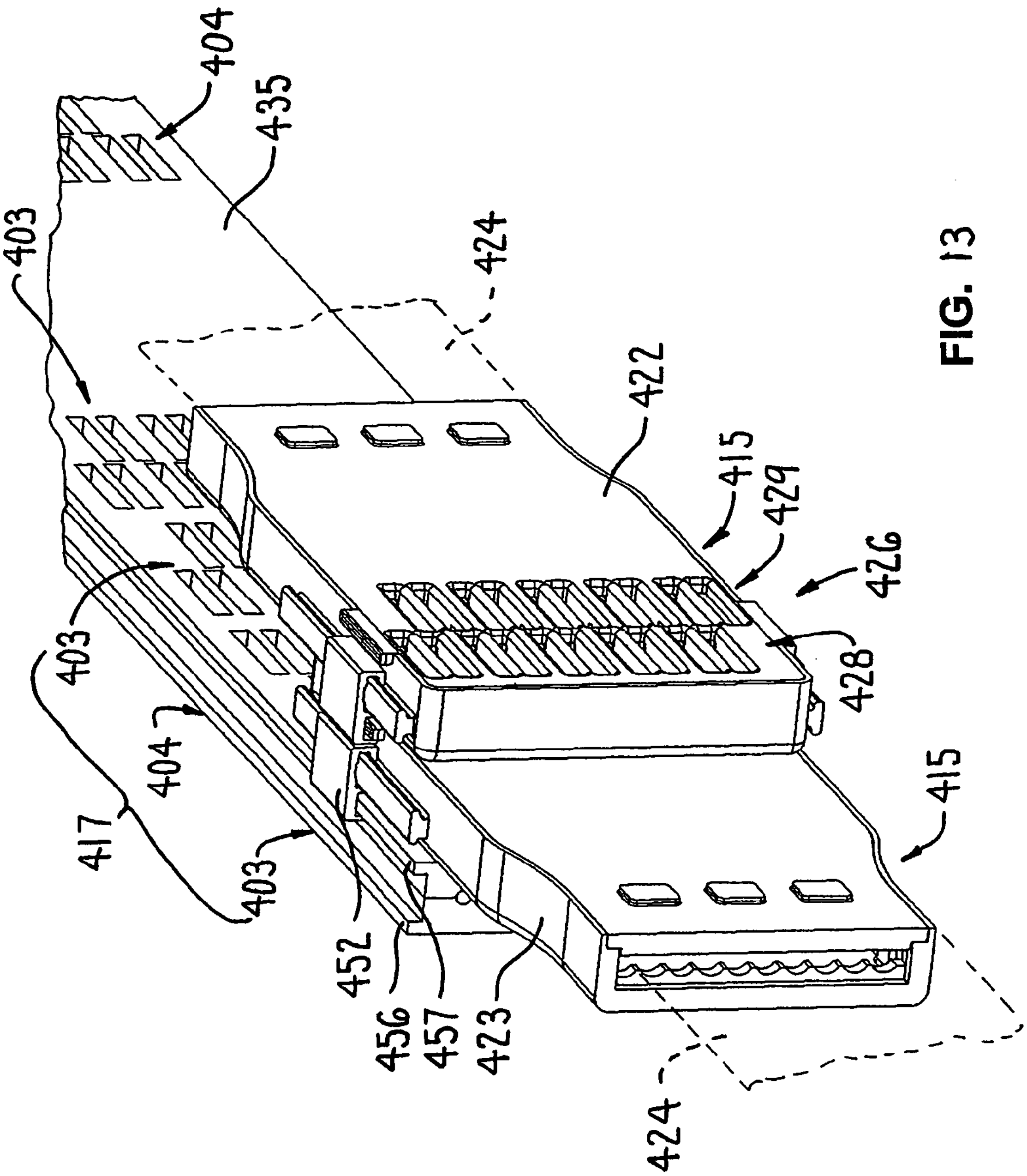
FIG. 13 is a perspective view of two flex connectors connected to the PDA.
Figure 14:
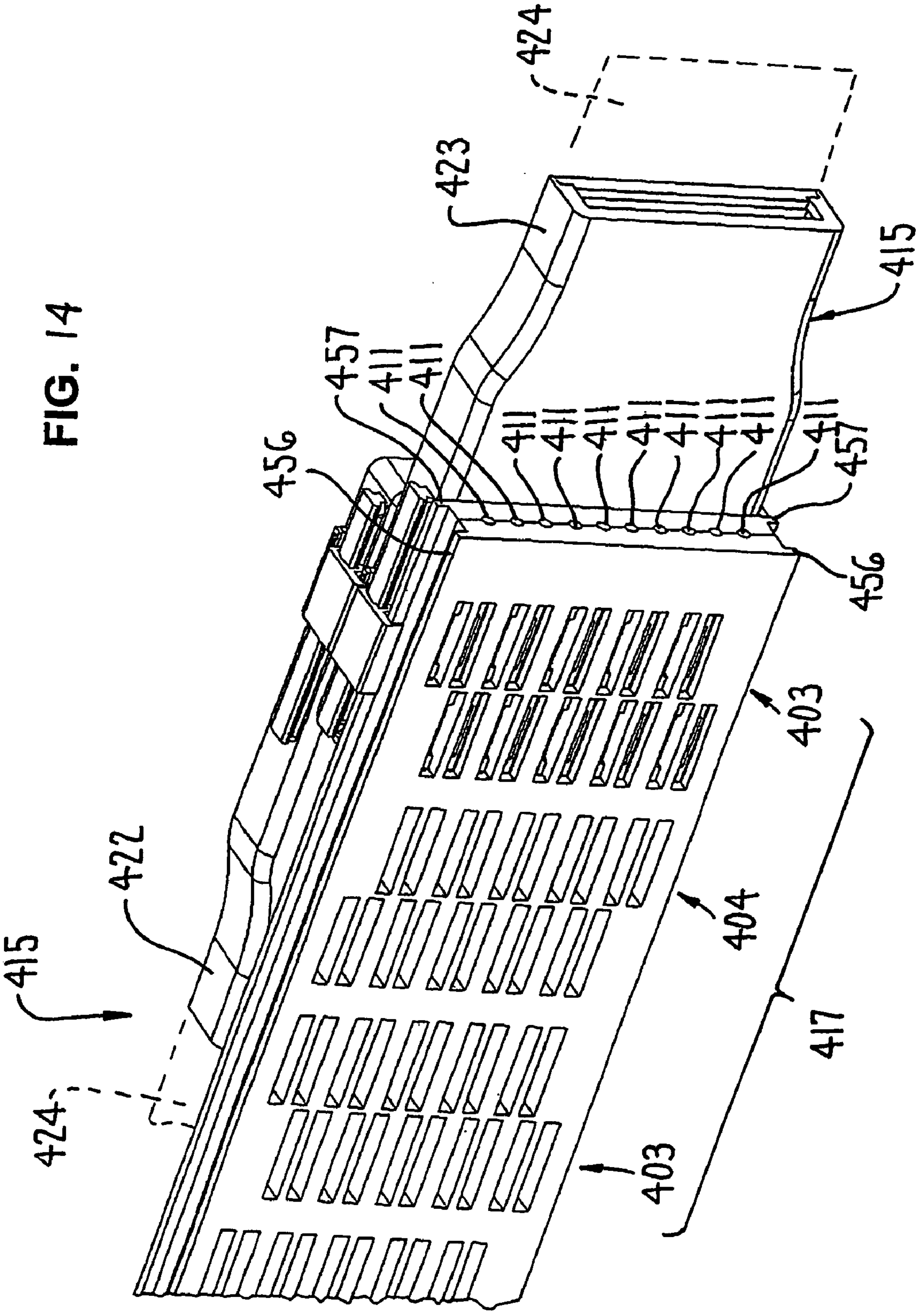
FIG. 14 is a rear perspective view of the flex connectors and PDA of FIG. 13.

Referring again to FIG. 11, the PDA 401 is formed with a set of three opening groups at each opposite end which are associated with each other and used to electrically connect serially adjacent PDAs 401 together through a flex connector 415 (FIGS. 13 and 14). Additionally, intermediate pairs of groups are associate with each other for the mounting of receptacles.

Specifically, the PDA 401 includes two intermediate grouping pairs 416 which each comprise an opening group 403 and an opening group 404. On the left end of the PDA 401, a group set 417 is provided on the left end 418 of the PDA 401. The group set 417 comprises a spaced apart pair of groups 403 with a group 404 disposed therebetween. The opposite right end 419 of the PDA 401 includes a further group set 420 which comprises a spaced apart pair of groups 404 having another opening group 403 disposed centrally therebetween.

More particularly as to the flex connector 415 (FIGS. 15–20), each flex connector 415 includes a pair of connector plugs 422 and 423 at the opposite ends thereof, which are joined together by a bendable conductor body 424, which includes electrical conductors extending therethrough.

The plug 422 includes a group 426 of openings 427, which group 426 is defined by two vertical rows 428 and 429 of openings 427. The row 428 is at a higher elevation relative to the row 429 such that the opening group 426 has substantially the same configuration as the PDA opening group 403.

Figure 15:
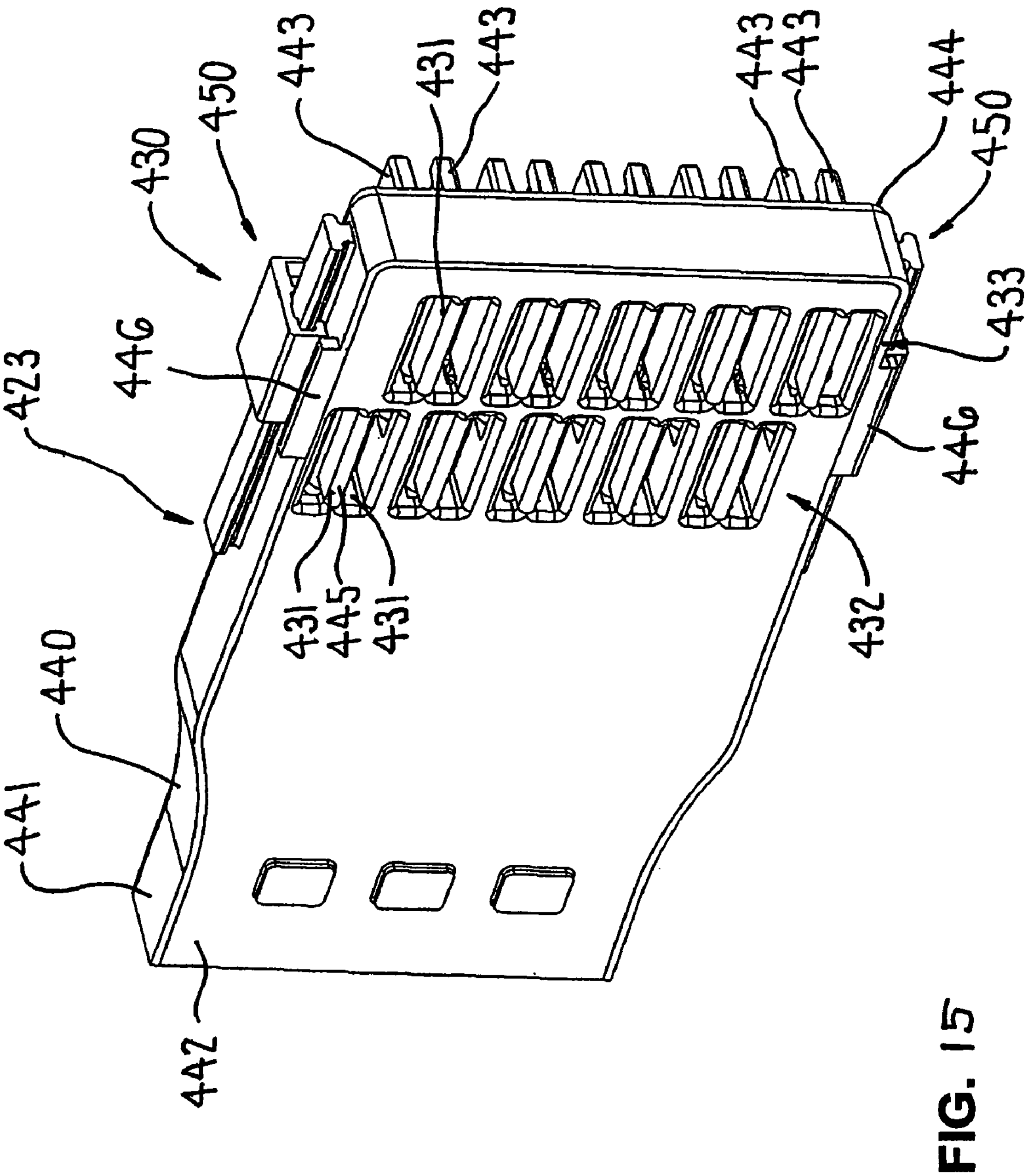
FIG. 15 is a front perspective view of a connector plug for the flex connector.

The plug 423 as illustrated in FIG. 15 similarly includes a group 430 of openings 431, which are arranged in two vertical rows 432 and 433, with row 432 being at a higher elevation. As such, the opening group 430 on the right end connector plug 423 is structurally and functionally similar to the opening group 403 described above.

The group set 417 and the group set 420 allow the flex connector 415 to be used on different sides of the PDA 401. Specifically, when the flex connector 415 is on the front PDA side 435, the plug 423 may be connected to either of the groups 403 in the group set 417. The plug 422 on the opposite end thereof would then be connected to the opening group 403 in the group set 420 on the serially adjacent PDA 401.

Specifically, as to the connector plugs 422 and 423, these components are formed substantially the same as each other and thus, while the following discussion is directed more specifically to the connector plug 423, this discussion also applies to the plug 422.

Figure 22:
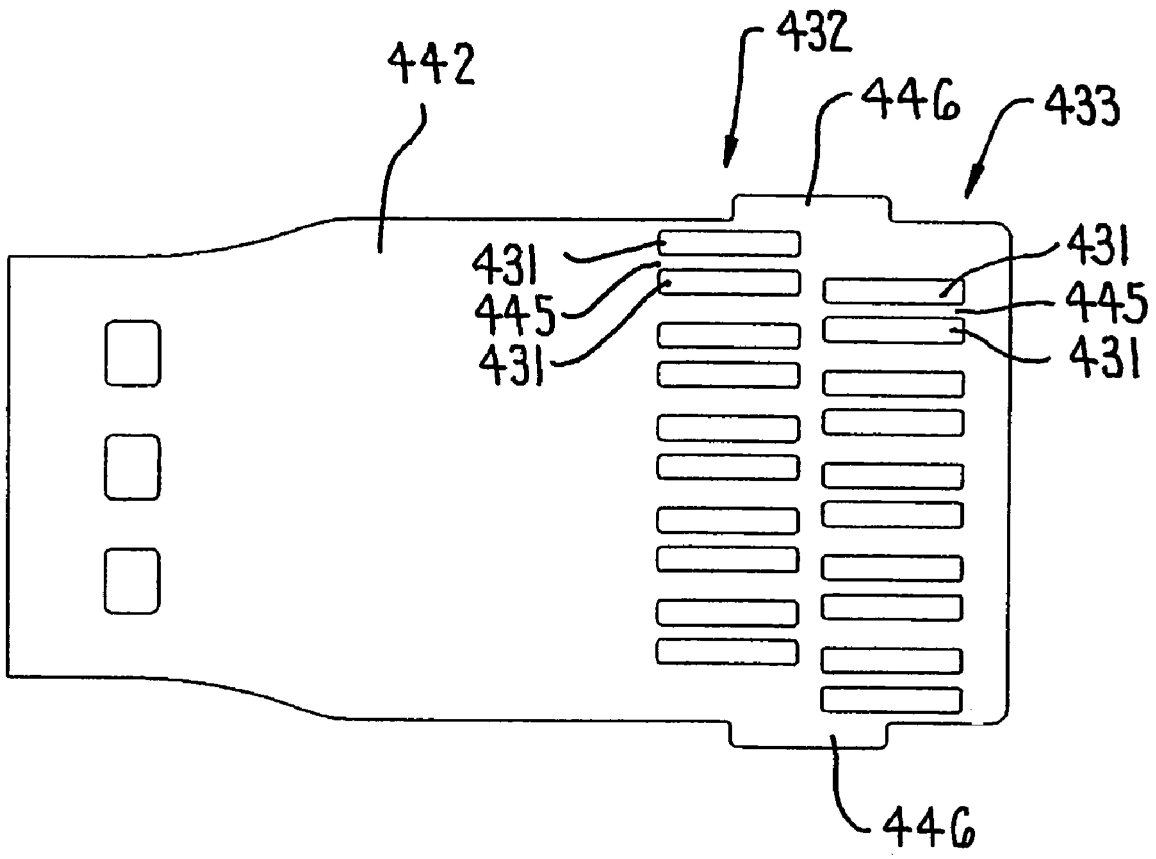
FIG. 22 is a plan view of a cover for the plug housing.

Referring to FIG. 15, the connector plug 423 includes a plug housing 440 defined by a housing base 441 and a housing cover 442. The plug housing 440 generally includes the opening group 430 formed in the cover 442 and also includes a plurality of contact posts 443 which project from an inside face 444 of the housing base 441. More particularly as to the cover 442, the cover 442 is illustrated in FIGS. 15 and 22. It is formed flat with the two rows 432 and 443 of openings 431 formed therein. Openings 431 are vertically spaced apart and generally arranged in pairs, wherein each pair of openings 431 is separated by a bridge or land 445. Additionally, locking flanges 446 project vertically from the upper and lower edges of the cover 442.

Figure 16:
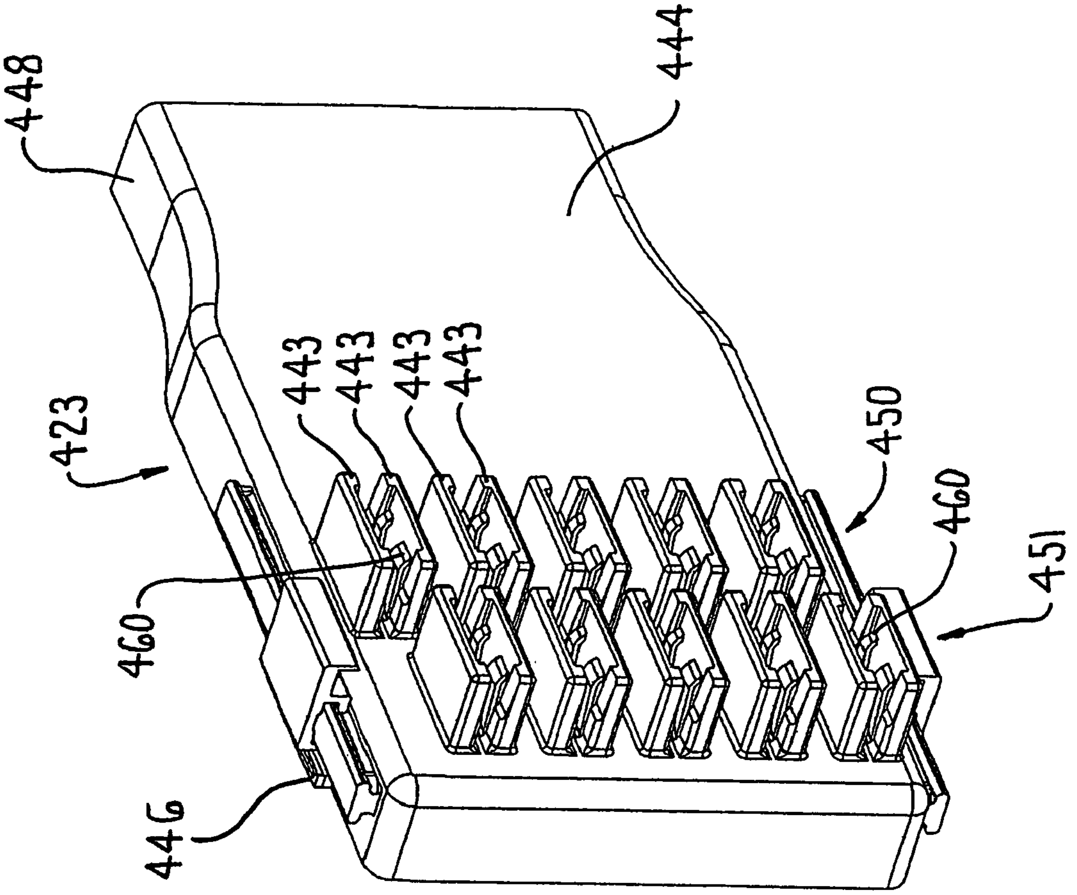
FIG. 16 is a rear view of the connector plug.
Figure 17:
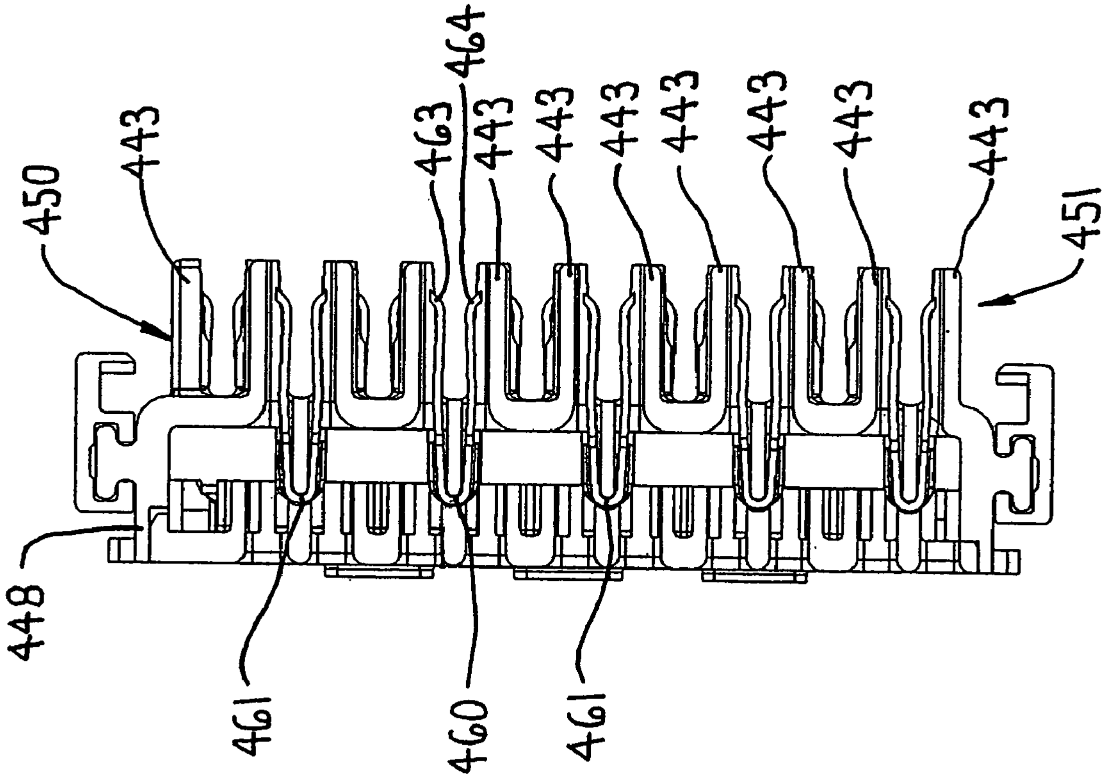
FIG. 17 is an end cross section of the connector plug.
Figure 18:
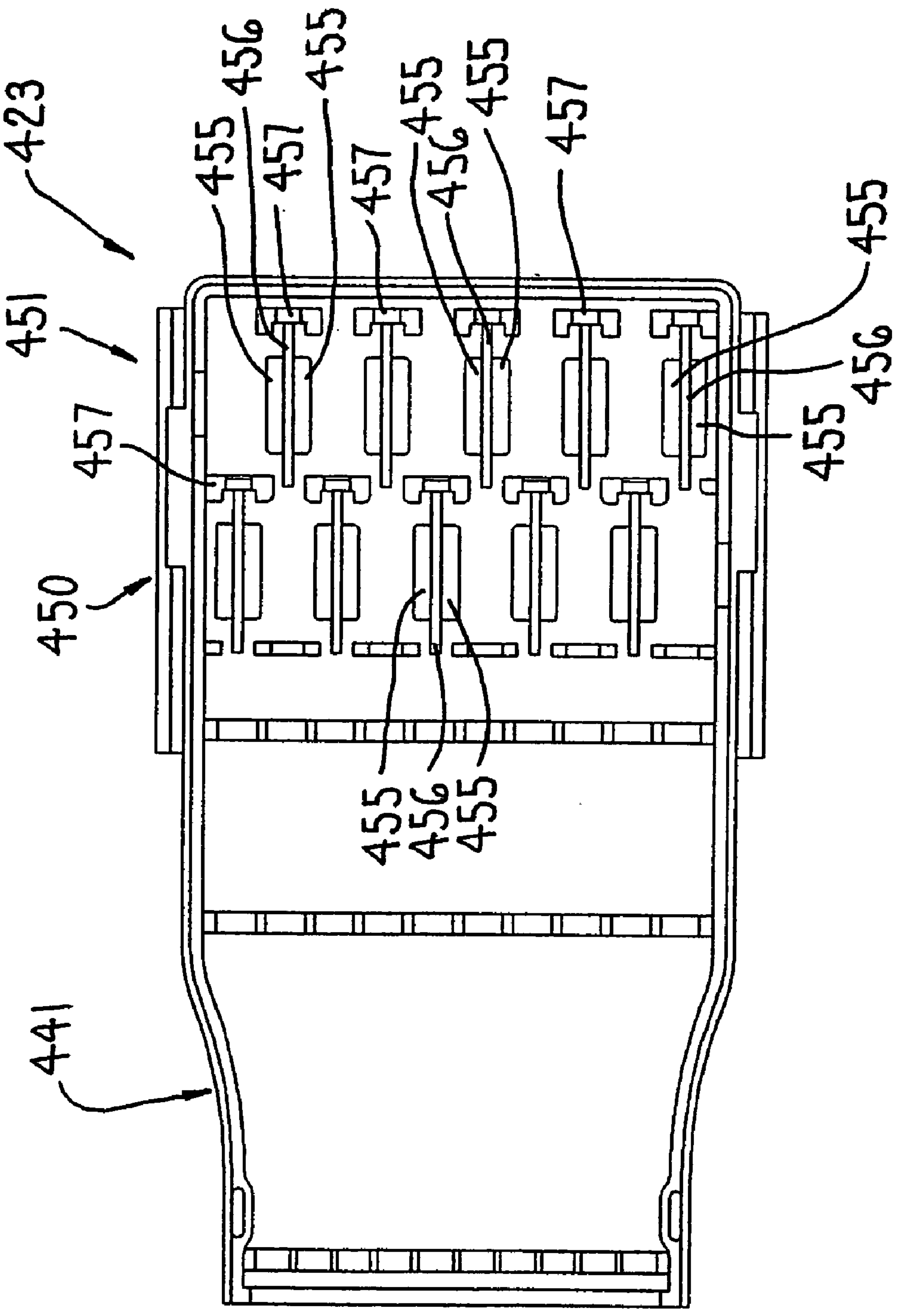
FIG. 18 is a plan view of a plug housing.
Figure 19:
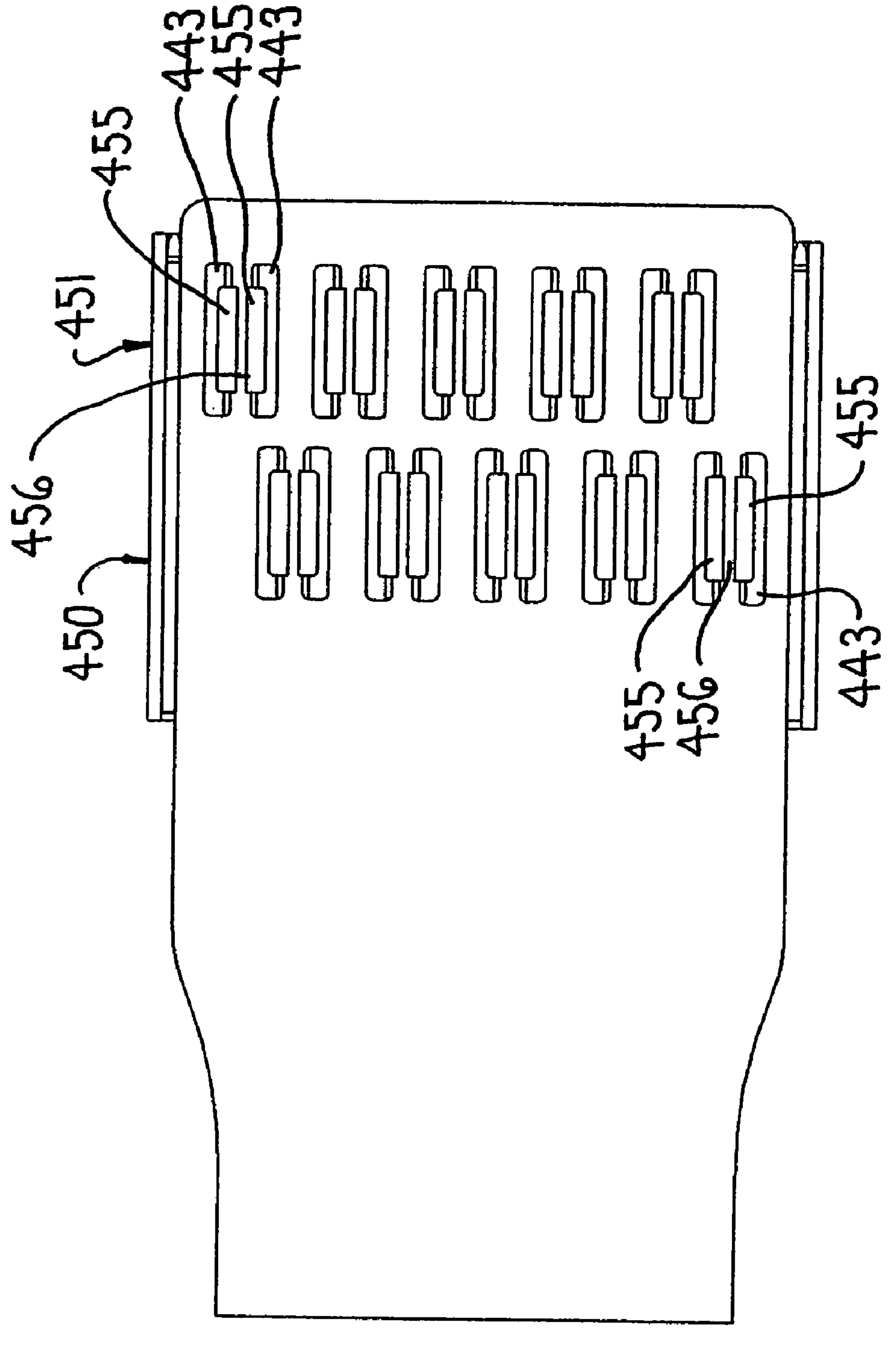
FIG. 19 is a bottom view of the plug housing.

Referring to FIG. 16, the base 442 has a peripheral side wall 448 and a main wall 449 from which the individual posts 443 project. The posts 443 are arranged in two vertical rows 450 and 451 having the same relative spacing as the openings 431 and specifically the vertical rows 432 and 433 thereof. The posts 443 are arranged in pairs of such posts 443 which are substantially identical to each other but arranged as mirror images in vertically spaced relation. The pairs of posts 443 are vertically spaced apart so as to fit within a corresponding pair of openings. For example, the posts 443 may fit into the openings 405 of the PDA 401 with the material bridge 410 being received between the posts 443. Alternatively, when one flex connector 415 is connected to another such as illustrated in FIGS. 13 and 14, the posts 443 would fit within the openings 427 of the connector plug 422, with a material bridge 455 being slideably received between the associated pair of posts 443.

More particularly, as to FIGS. 16–20, each post 443 has a rectangular opening 455 adjacent to an inside face thereof on the interior of the base 441. Each associated pair of openings 445 is separated by a rib 456. Additionally, each rib 456 extends and terminates at a support block 457.

Figure 20:
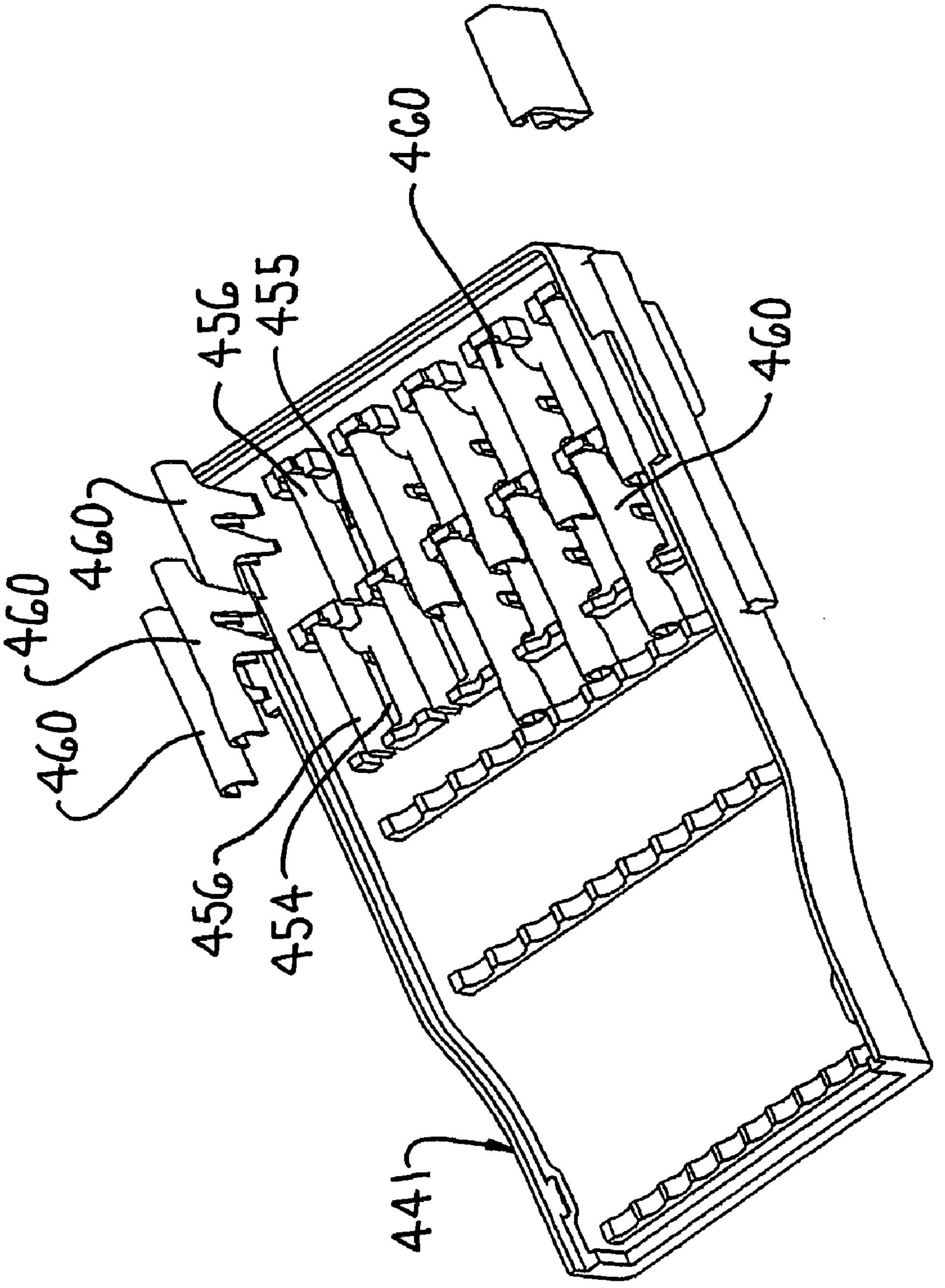
FIG. 20 is a perspective view of the plug housing.
Figure 21:
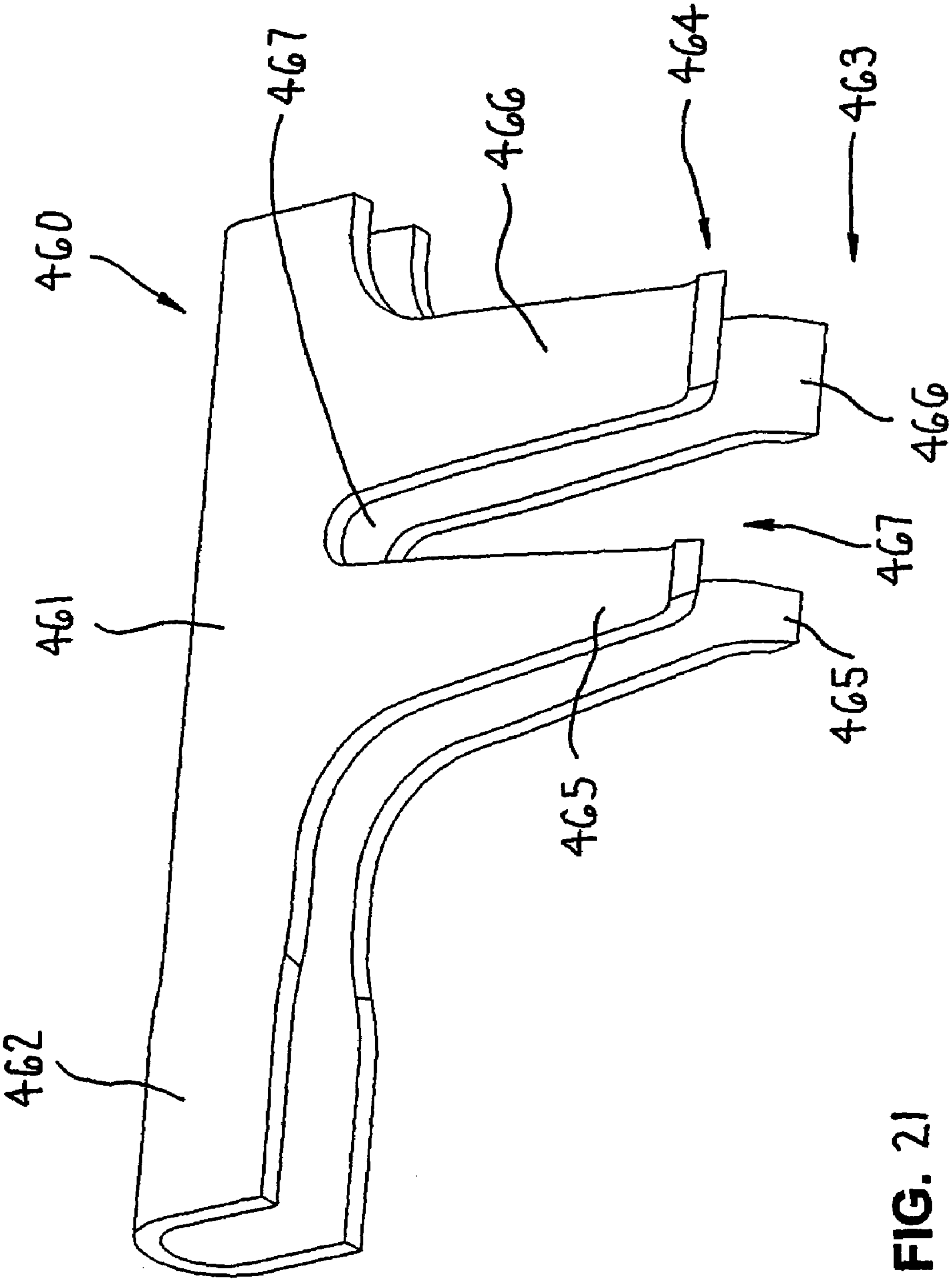
FIG. 21 is a perspective view of an electrical contact.

Referring to FIGS. 20 and 21, a generally U-shaped contact body 460 is mounted on each support rib 456. The front end of each contact body 460 fits within the support block 457 and is restrained from movement thereby. The contact body 460 is formed from a U-shaped barrel or spine section 461 having an enlarged semicylindrical conductor seat 462 at one end thereof. The conductor seat 462 is adapted to receive a conductor wire therein and which seat 462 is soldered to the free end of the wire. Additionally, a pair of contact prongs 463 and 464 project downwardly from the barrel 461. Each pair of prongs 463 and 464 comprises a narrow prong 465 and a wide prong 466 which are separated from each other by a gap 467.

When assembled together, the barrel portion 461 of each contact body is exposed within the interior and when the cover 442 is mounted in place, the barrel portions 461 are accessible through the openings 431 in the cover 442. Therefore, when joining two flex connectors 415 together such as in FIG. 13, the flex connectors can be electrically interconnected by engagement of the posts 443 therein. Additionally, the posts 443 of the plug 423 fit into a pair of openings 427. This allows the pairs of prongs 463 and 464 to resiliently fit over the barrel 461 of the lower contact body 460. Thus, the two plugs 422 and 443 are electrically connected together.

Referring to FIGS. 13–16, each connector plug 422 or 423 includes latching devices 450 on the upper and lower edges thereof. Each latching device comprises a T-shaped guide rail 451 and the locking flange 446 which is disposed parallel to but spaced sidewardly from the guide rail 451. Further, a slideable latch 452 is slideably connected to the rail 451 so as to be movable therealong. The latch 452 includes a groove 453 which fits over the guide rail 451. The latch 452 further includes a locking flange 454 which slides over and lockingly engages the flange 446 to prevent separation of the two plugs 422 and 423. When the two plugs 422 and 423 are fitted together, the latch 452 is then slid along the guide rail 451 until the flange 454 slides over and engages the flange 446. Thus, all of the components can be positively locked together.

Referring to FIG. 13, the same latch 452 also may be used to engage one of two locking ribs 456 or 457 which extend along both of the opposite side edges of the PDA 401.

In addition to the foregoing, each plug 422 or 423 may be fitted to the PDA 401 by insertion of the posts 443 into the openings 405. The prongs 463 and 464 spread apart as they pass over the bridge 410 between the openings 405 and then resiliently spring back together into contact with the respective conductor 411.

The system 400 functions similar to the above described power distribution system 10 such that further discussion of the system components such as a branch connector or a receptacle is not required.

Figures 23, 24, 25:
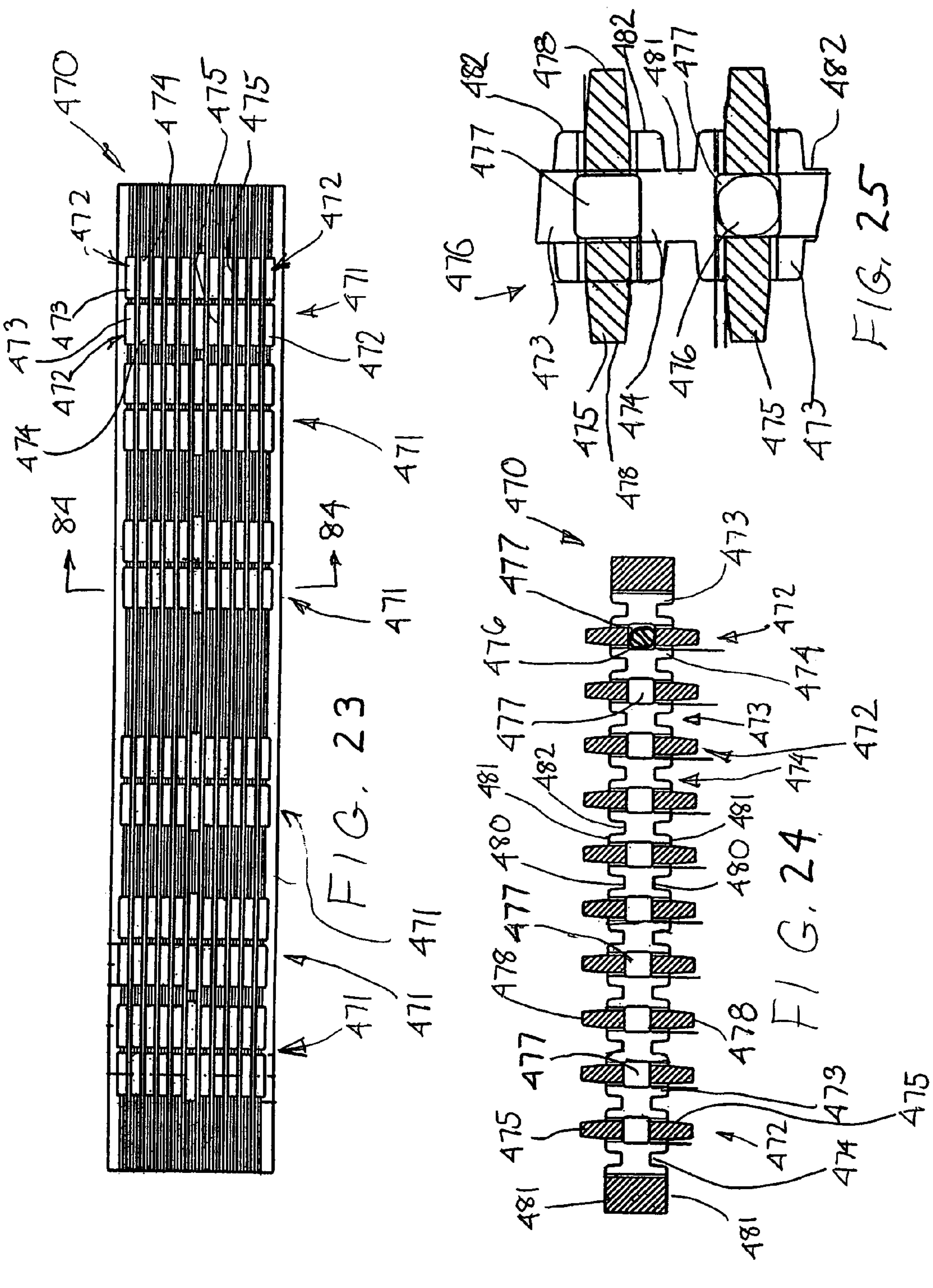
FIG. 23 is a front view of an extruded, one-piece power distribution assembly.
FIG. 24 is a side cross sectional view of the power distribution assembly as taken along line 84—84 of FIG. 23.
FIG. 25 is an enlarged partial view of the side cross section.

Referring to FIGS. 23–25, an additional power distribution assembly construction is illustrated therein wherein power distribution assembly 470 structurally and functionally operates substantially the same as the power distribution assemblies described above. The PDA 470 embodies additional inventive features in the structure and manufacture thereof.

More particularly, the PDA 470 includes groups 471 of openings 472 which are arranged in a substantially similar pattern to those groups of openings illustrated in FIG. 11. In this arrangement, each opening 472 that provides access to a conductor is defined by a first opening half 473 and a second opening half 474 wherein each interior electrical conductor 476 extends between a pair of opening halves 473 and 474. Therefore, each opening 472 in effect is defined by two opening halves 473 and 474 and the openings 472 in one column of the grouping 471 are aligned in side by side relation with the respective openings 472 of the next adjacent row of openings. However, they still functionally operate the same as that described above in that the receptacles, flex connectors, jumpers and other components engage with these openings 472 and have posts that are staggered and engage with a staggered pattern of the openings 472. Further the pattern of PDA openings allows the staggered configuration of the connectors to plug-in from either side of PDA.

Referring to FIG. 24, the PDA 470 preferably is formed of a one-piece extruded construction with the cross sectional shape illustrated in FIG. 24. This profile includes a plurality of upstanding parallel ribs 475 which extend along the entire length of the PDA 470 and separate the respective opening halves 473 and 474 one from the other. These ribs 475 thereby span the opening halves 473 and 474 and overlie the electrical conductor 476 (FIG. 24) which extends therebetween. Thus, when a receptacle or the like is plugged into an opening 472, the fingers of an electrical contact engage or straddle the opposite sides of the conductor 476.

Each conductor 476 spans the entire length of the PDA 470 through the parallel, rectangular bores 477 provided therein. The rectangular bores 477 are formed during the extrusion process and thereafter the conductors 476 are slid longitudinally therein. As seen in FIG. 25, the four corners of the rectangular bores 477 are disposed radially outwardly of the conductor 476 and provide the additional function of receiving any access plastic material or debris which might be generated within the bore 477 during insertion of the conductor 476 or during the extrusion process. As such, each conductor 476 is in four-point contact with the side walls of the bore 477 which reduces friction during the insertion process.

As to the thickness of the PDA 470, this PDA 470 has a maximum thickness defined by the terminal side faces 478 of the ribs 475 which thereby defines a maximum thickness for the PDA which thickness generally corresponds to the thickness of the PDA's described above. These surfaces 478 define the face against which the receptacles abut when engaged therewith.

The PDA 470 also includes inwardly extended grooves 480 (FIG. 24) which define the narrowest PDA thickness with intermediate PDA surfaces 481 being defined between the bottom face 482 of the grooves 480 and the outer faces 478 of the ribs 475. The faces 481 and 482 thereby define a thin region through which the opening halves 473 and 474 may be formed by mechanical punching through the extruded PDA material. This provides an improved profile during the manufacturing process such that less material is used during extrusion of the PDA 470 and punching is made easier by the thinner regions.

In this manner, the PDA 470 is formed which PDA is adapted for engagement by the various components described herein.

Turning next to FIGS. 26–30, an additional PDA construction is illustrated wherein the PDA 500 is formed with a two-piece extruded profile. More particularly, the PDA 500 has a similar arrangement of opening groups 501 wherein each opening 502 is defined by opening halves 503 and 504. Here again the openings 502 are formed in side by side relation but are engaged in a staggered manner by a receptacle, flex connector or the like.

Figure 27:
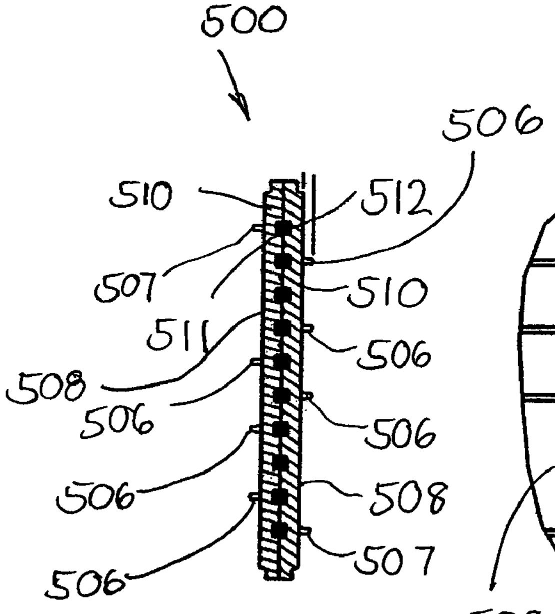
FIG. 27 is an end cross sectional view of the power distribution assembly as taken along line 27—27 of FIG. 28.

The PDA 500 is formed by a thin body section 505 and has a plurality of upstanding ribs 506 and 507 with relatively thin flat lands 508 and 509 being formed therebetween. Referring to FIG. 27, the PDA 500 is defined by opposed extrusion halves 510 which are formed identical to each other but mate together in inverted relation as seen in FIG. 27. The extrusion halves 510 include rectangular bores 511 therethrough like the rectangular bores described above which each receive an electrical conductor 512 longitudinally therethrough.

Figure 28:
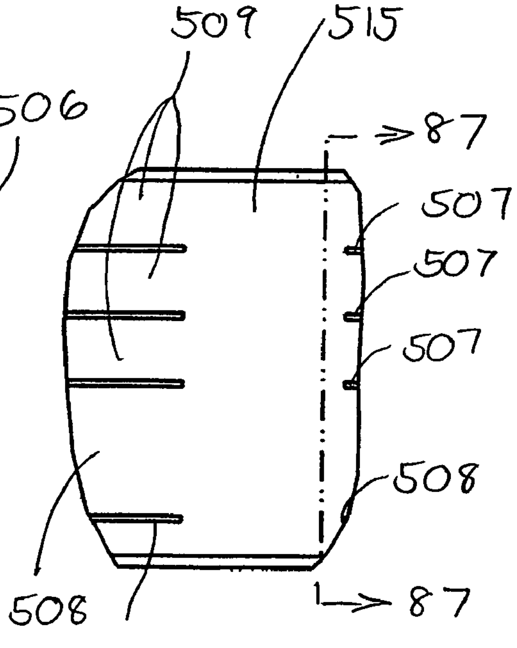
FIG. 28 is an enlarged front view of a portion of the power distribution assembly.

Referring to FIG. 28, the PDA 500 is grooved as illustrated in FIG. 28 to define a mounting bracket groove 515 which generally extends vertically. A number of such grooves 515 are provided spaced apart from each other depending upon the number of mounting brackets needed to mount a particular length of PDA to a wall panel or other furniture component. Each groove 515 is provided in pairs on opposite sides of the PDA 500 and allow for a mounting bracket to be clamped therebetween against the uniform flat face of the groove 515. The ribs 507 and 508, however, still extend between such grooves 515.

Figure 30:
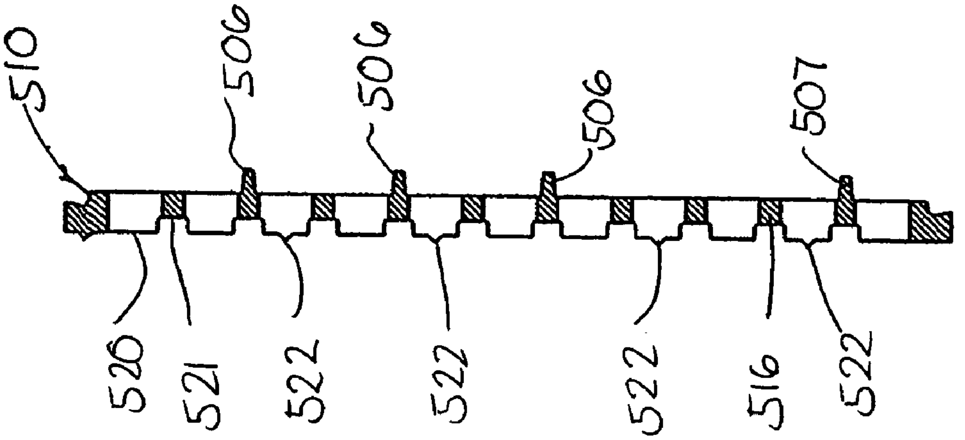
FIG. 30 is a cross sectional view of one of the extrusion halves.
Figure 29:
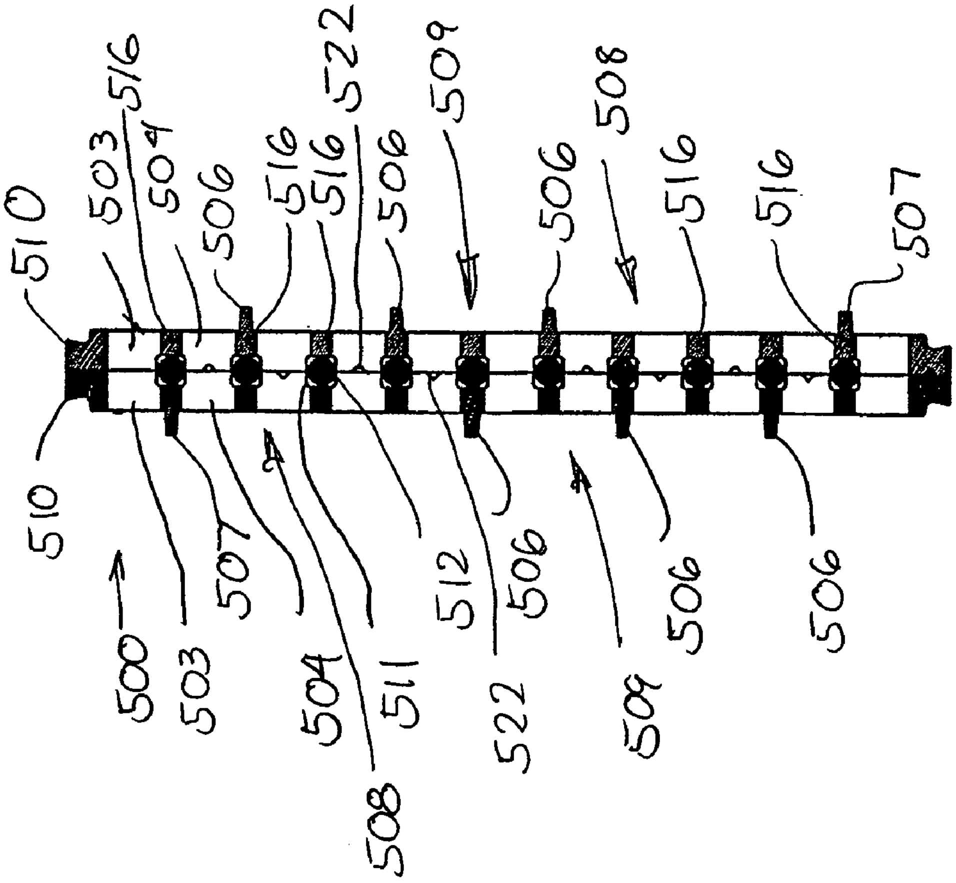
FIG. 29 is an end cross sectional view as taken along line 29—29 of FIG. 26.

Referring more particularly to FIGS. 29 and 30, the ribs 506 and 507 define the maximum thickness of the PDA 500, against which the system component such as a receptacle abuts when mounted thereto. These extrusion halves 510 thereby define the opening halves 503 and 504 therein which extend entirely through the thickness of the PDA 500. These opening halves 503 and 504 are separated from each other by horizontal bridge sections 516 which align longitudinally with the electrical conductor 512 that extends through the rectangular bores 511. Some of these bridge portions 516 align with the ribs 506 or 507 while others do not in the region of the flat lands 508 and 509.

Referring to the single extrusion half 510 illustrated in FIG. 30, this extrusion half 510 includes the structures described above and further has an inside face 520 which is grooved so as to define a bore section 521 that defines one half of the rectangular conductor bore 511. Additionally, this inside face 520 includes energy directors 522 which project inwardly to an apex and are configured to facilitate sonic welding of the extrusion halves 510 together. During assembly, the extrusion halves 510 are first extruded as a single piece as seen in FIG. 30 and then two opposed bearing halves 510 are disposed together in facing relation and ultrasonically welded wherein the energy directors 522 are disposed alternatingly as seen in FIG. 29 and serve to contact the other extrusion half 510 and assist in fusing the two extrusion halves 510 together during the assembly process.

The rectangular shape of each bore 511 causes less friction on the conductor wire being inserted therethrough while the square shape is easier to extrude and maintain the size thereof during this process. Additionally, the open spaces at the corners define dumping regions or pockets for debris. This debris may result from the punching process when punching the openings wherein burrs may extend into the bore, or may result from scraping of the conductor along the bore surfaces during longitudinal insertion through the bore 511. Also, with the two piece construction of FIGS. 29 and 30, the ultrasonic weld process may result in excess material flow into the bores which excess material may flow or squirt into these bores 511.

The construction of FIGS. 26–30 provides an improved PDA construction 500 which provides an improved result during the punching process and construction of the PDA 500.

Referring to FIGS. 31–36, a third type of PDA construction is illustrated which essentially uses a one-piece extrusion wherein the post-receiving openings instead are defined by insert assemblies 542 that fit within relatively large windows within a PDA 530.

Figure 26:
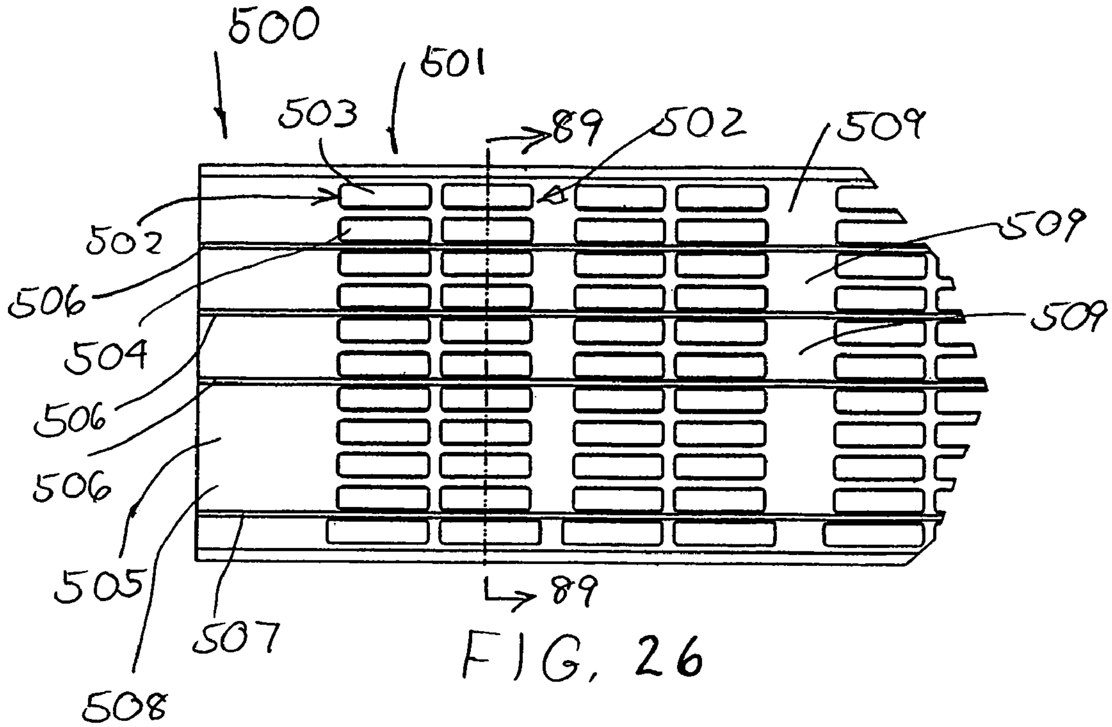
FIG. 26 is a partial front view of an extruded, two-piece power distribution assembly.
Figure 31:
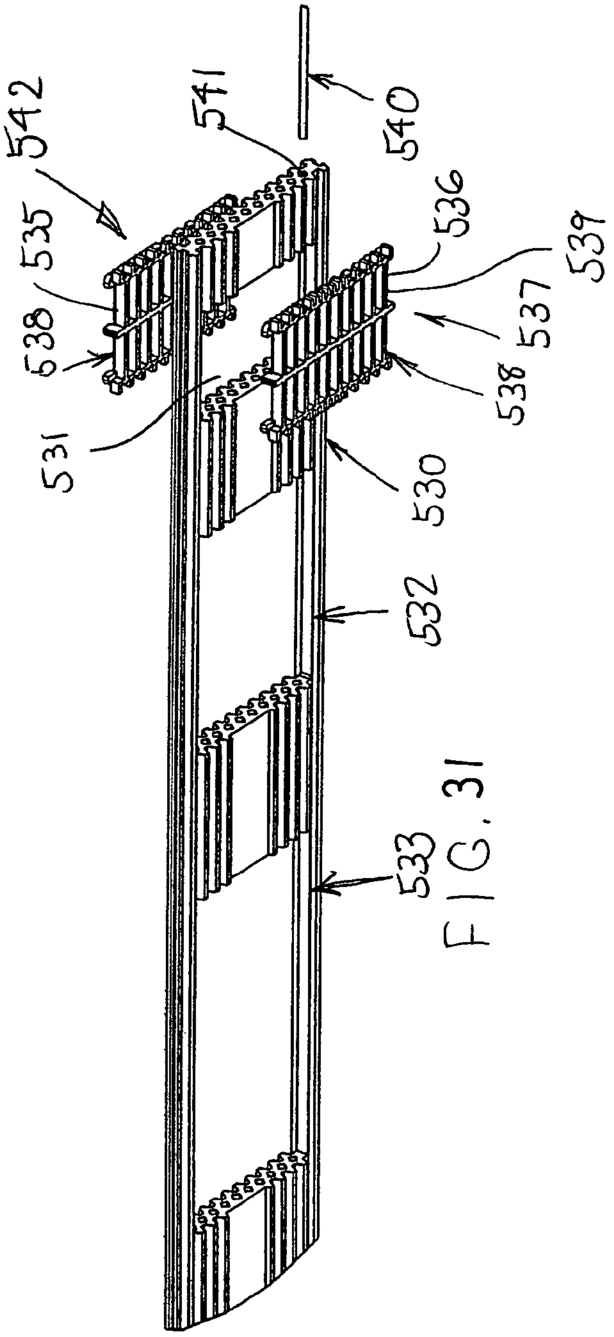
FIG. 31 is an isometric view of an extruded multi-component power distribution assembly having inserts which define groups of openings.

More particularly, the PDA 530 is illustrated with three such windows 531, 531 and 533 being present in various sizes. The single opening 531 is adapted to receive two inserts 535 and 536 to define an insert assembly 542 which inserts 535 and 536 together define a respective group 537 of openings 538. Inserts 535 and 536 thereby define the same pattern of openings as described above relative to the PDA's 470 (FIG. 23) and 500 (FIG. 26). These openings 538 essentially have opening halves separated by bridges 539 that overly the conductor 540 that extends through the length of the PDA 530. In FIG. 31, an end of the conductor 540 is illustrated just prior to insertion into a corresponding bore 541 in the PDA 530. The inserts 535 and 536 are discussed in further detail herein. It will be understood that while a single width insert assembly 542 is provided, this insert assembly 542 may be provided as a double-width for the opening 532 or a triple-width for the opening 533 either of which would have additional opening groups 537.

Figure 32:
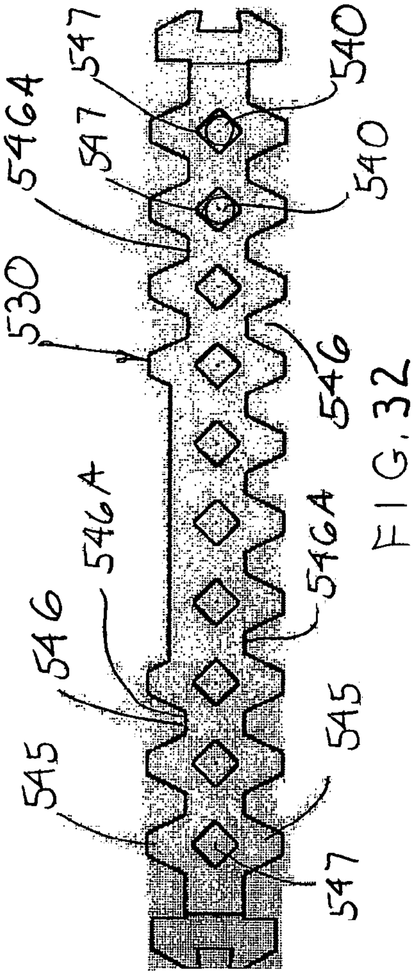
FIG. 32 is an end view of the power distribution assembly.

Referring to FIG. 32, the PDA extrusion 530 is formed with a pattern of ribs 545 and grooves 546 which primarily are provided to improve the extrusion process. The ribs 545 define the maximum thickness of the PDA 530 while the grooves 546 define the minimum thickness thereof at the groove surface 546A.

In the region disposed between each opposite pair of such ribs 545, a rectangular conductor bore 547 is provided which is substantially similar to those bores described above and further discussion thereof is not believed to be required. Notably, these bores 547 are rotated 45° from the orientation of the bores 477 shown previously. Either orientation may be applied to all the PDA constructions disclosed herein and provide the same advantages relative to debris. These parallel bores 547 are adapted to receive the conductors 540 longitudinally through the entire length of the PDA 530.

Figure 33:
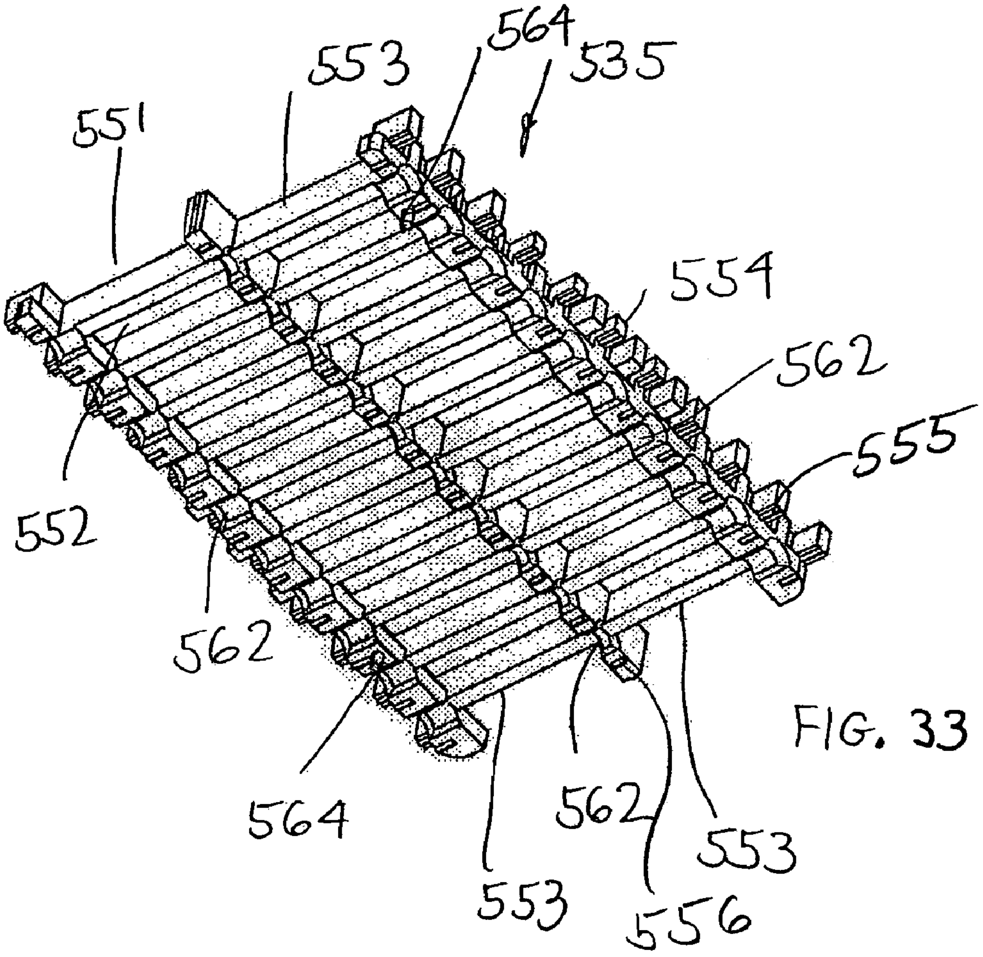
FIG. 33 is an inside isometric view of the first insert.
Figure 34:
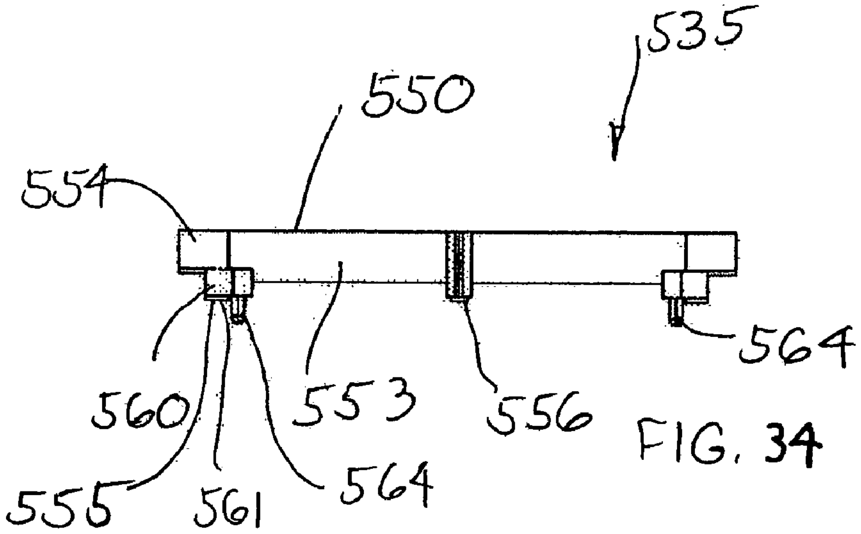
FIG. 34 is a top view of the insert.
Figure 35:
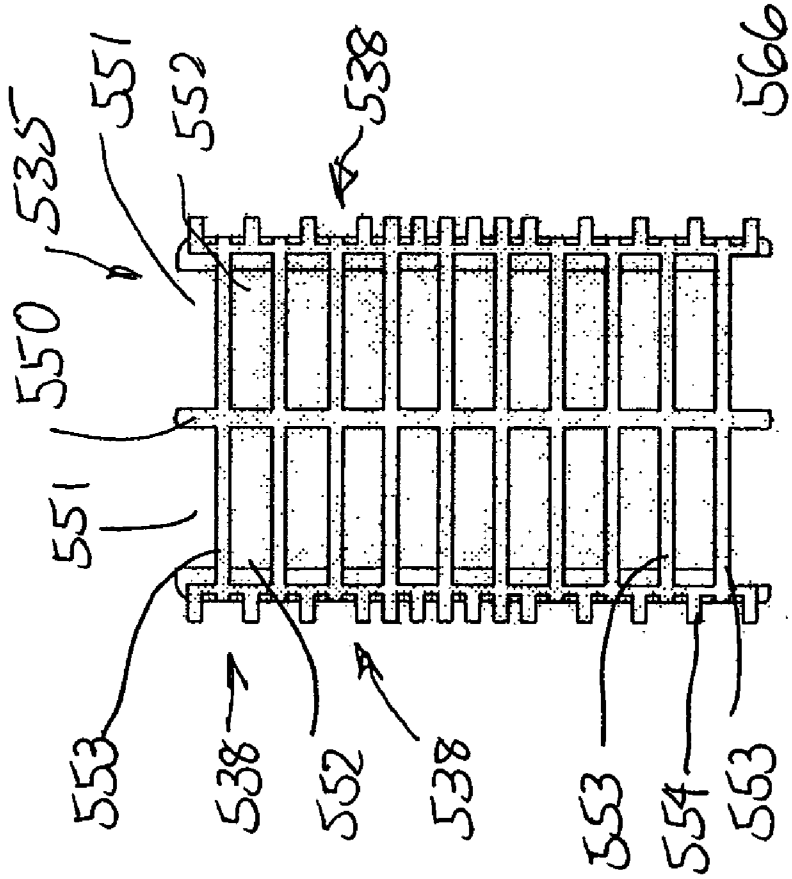
FIG. 35 is an outside view of the insert.

Referring to FIGS. 33–35, the first insert 535 is illustrated. This insert 535 is adapted to be received within the respective opening 531 while resting against the face of the PDA 530. In this regard, insert 535 includes an outer face 550 in which the opening halves 551 and 552 are provided in vertically aligned pairs to essentially define an opening 538. A plurality of such opening halves are provided to define a plurality of openings 538 which are aligned in vertical grooves and also arranged in side by side relation. This allows for staggered engagement by the staggered posts of the receptacles as fully described above. Each of these opening halves 551 and 552 are separated by a bridge portion 553 which is adapted to overlie a respective conductor 540.

A plurality of additional locator flanges 554 are provided which are each located between an adjacent pair of the bridged portions 553. The locator flanges 554 are each adapted to fit into a respective one of the PDA grooves 546 and abut against the bottom groove face 546A (FIG. 32) to thereby locate the insert 535 within the opening 531 so that the bridged portions 553 of the insert 535 overlie and are aligned with their respective conductors 540. The bottom or interior face of each flange 554 includes an energy director 555 while additional energy directors 556 are provided in the middle of the insert 535. These allow for ultrasonic welding of the flanges 554 to the groove face 546A by the directors 555 and the opposing inserts 535 and 536 directly together by the directors 556.

Additionally as seen in FIG. 34, the insert 535 is formed with a generally rectangular projecting portion 560 that is adapted to closely fit within the rectangular PDA window 531. The inside face 561 of this projecting portion includes arcuate grooves 562 which generally align with the bridged portions 553 and receive the conductors 540 such that the conductors 540 are sandwiched within these grooved portions 562 between the inserts 535 and 536.

Figure 36:
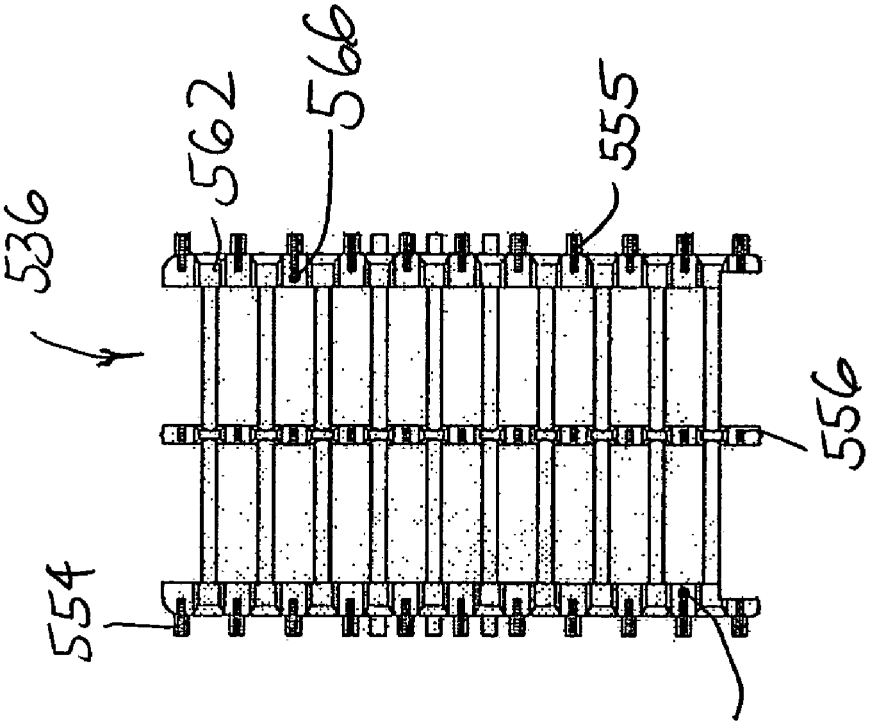
FIG. 36 is an inside view of a second insert that mates with the first insert of FIG. 33.

To align the inserts 535 and 536 when fitting together, a pair of connector posts 564 are provided which project inwardly or rearwardly. Referring to FIG. 36, the opposite second insert 536 is formed substantially identical to the first insert 535 as described above and thus has common structural features. However the insert 536 includes a pair of alignment bores 566 which are adapted to receive the posts 564. The insert 536 also includes the same arrangement of energy directors 555 and 556. Thus, the inserts 535 and 536 are inserted into their respective window 531 from opposite sides of the PDA 530, aligned and then rigidly affixed together by welding to enclose the window 531 and to provide a PDA assembly 530 which functions similar to those PDA's described above.

With the above described arrangements, several PDA constructions are illustrated in FIGS. 23–36.

Also, additional improved components for the power distribution system are described hereinafter.

Figure 38:
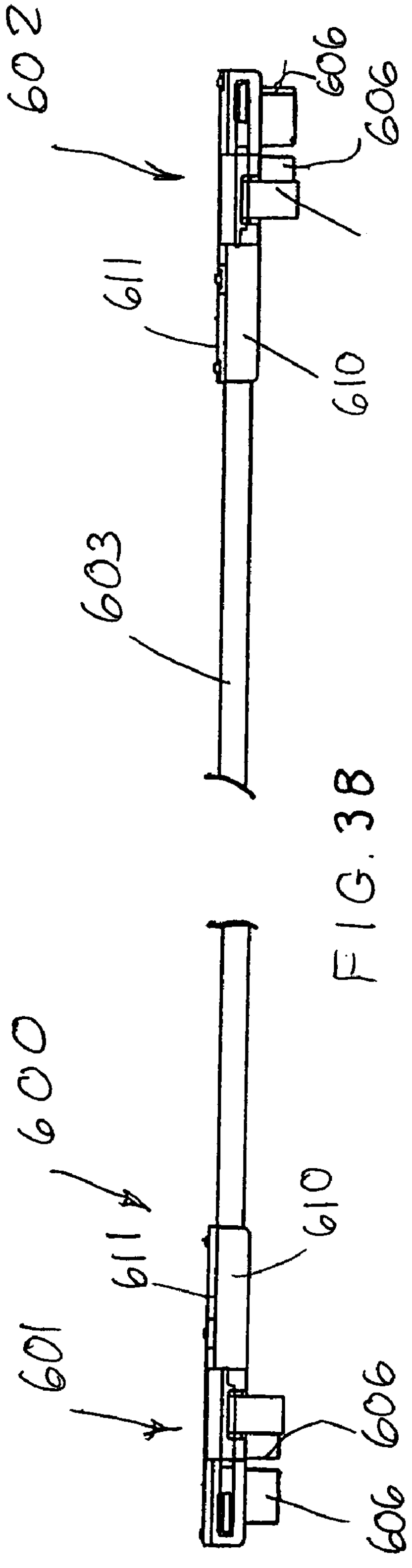
FIG. 38 is a bottom view of the flex connector.
Figure 39:
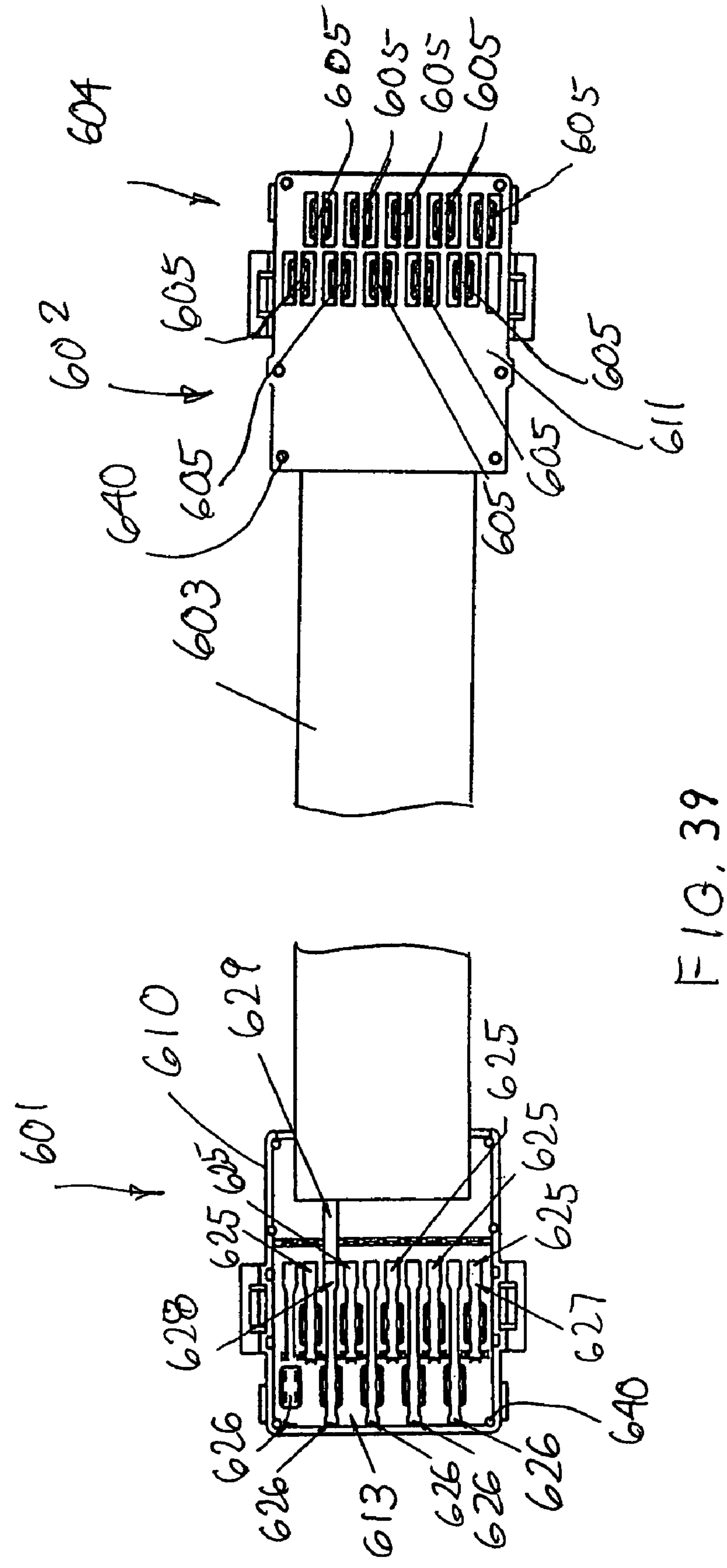
FIG. 39 is a back view of the flex connector with a top cover removed from one end thereof.

Referring to FIGS. 38–39, an improved flex connector 600 is illustrated. This flex connector 600 includes a pair of connector plugs 601 and 602 at the opposite ends thereof which are joined together by a bendable or flexible conductor body 603. Each plug 601 and 602 includes a group 604 (FIG. 39) of openings 605, which group 604 is defined by two vertical rows of such openings 605 in substantially the same pattern as that described above. Hence, the discussion of such components as already described above is equally applicable to the flex connector 600 and a detailed discussion of the structure and function is not believed to be required. Notably, however, the openings 605 are generally staggered.

Figure 37:
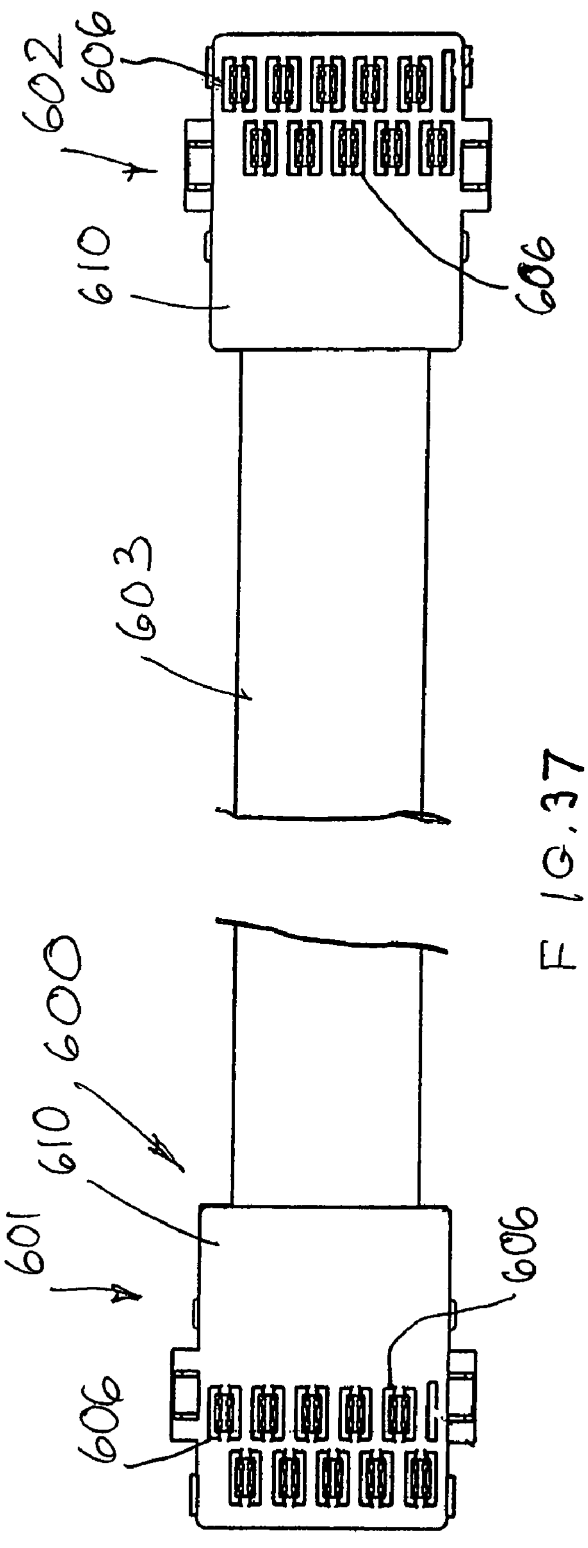
FIG. 37 is front view of a further flex connector.

Additionally, each plug 601 and 602 includes a staggered set of contact posts 606 (FIGS. 37 and 38). These posts 606 are also provided in a staggered relation that corresponds to the opening 605 and are adapted to engage any of the openings described above relative to the PDA's 470, 500 and 530. Each of these posts 606 is split so as to straddle the conductors of the above described PDA's from opposite sides. A more detailed discussion of such components is not required herein.

Each plug 601 and 602 generally is defined by a plug housing 610 and a cover 611. Referring to the plug housing 610 as illustrated in FIGS. 40–42, this plug housing 610 defines a hollow interior 612 defined by bottom wall 613 and a side wall 614. A bottom wall 613 includes the slotted posts 606 projecting downwardly therefrom. These posts 606 are defined by post sections 615 that are provided in pairs and define a slot 616 therebetween. Further, these posts 606 are aligned with the access openings 618 which are provided in a staggered relation for engagement with a corresponding staggered set of openings in the PDA's 470, 500 and 530.

The housing sidewall 614 also includes a pair of latches 620 that are integrally formed in cantilevered relation with the sidewall 614. These latches 620 have a hooked end portion 621 and a depressible finger pad 622 which may be pressed toward the side wall 614 to pivot the hook 621 outwardly and allow for disengagement of the plug 601 or 602 from the respective PDA or another component to which it may be engaged.

Figure 48:
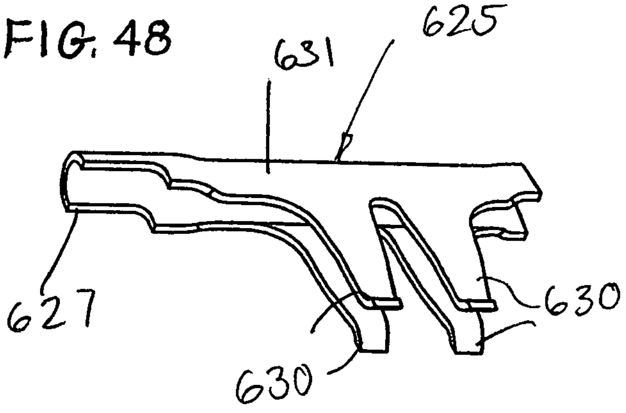
FIG. 48 is an isometric view of a short quad-point terminal or contact.
Figure 49:
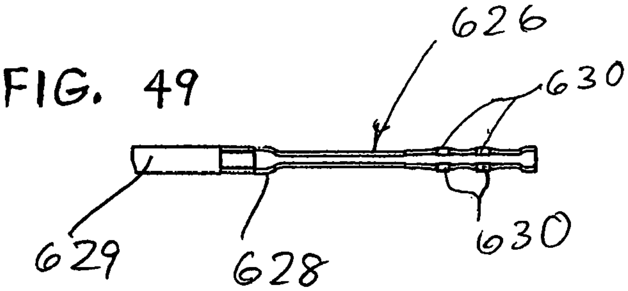
FIG. 49 is a bottom view of a long terminal.
Figure 50:
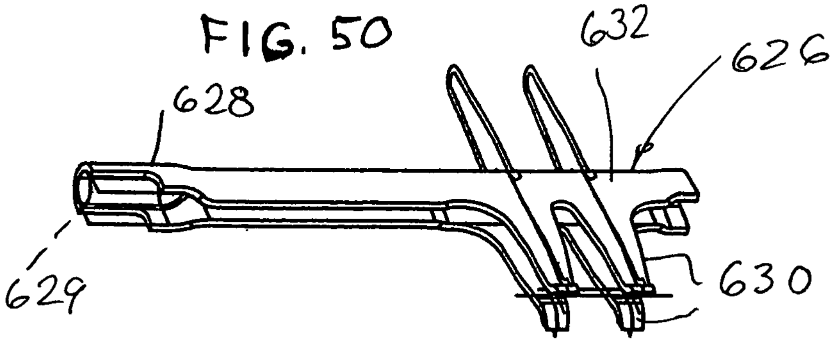
FIG. 50 is an isometric view of the long terminal.

Referring to FIG. 39, the housing 610 is adapted to receive a plurality of contacts or terminals therein. Preferably, the plugs 601 and 602 include a plurality of short terminals 625 and a plurality of long terminals 626 which are arranged in alternating relation. As such, each connector in 627 or 628 is aligned with each other as seen in FIG. 99 for uniform engagement with the conductors 629 of the conductor body 603. These terminals 625 and 626 are illustrated in further detail in FIGS. 48 and 49 and are provided with four contact fingers 630 that essentially define a quad-point configuration such as that discussed previously. It is noted that the barrel 631 or 632 of the respective terminals 625 or 626 are adapted for engagement with another terminal of another system component as will be described in further detail herein. The common reference numeral 630 is used to identify any of the contact fingers referenced above.

To locate the terminals 625 or 626 within the plug housing 610, a plurality of alignment ribs 635, 636, 637 and 638 are provided. The ribs 635 and 637 are provided in aligned pairs for cooperation with the long contact terminal 626 while the ribs 636 and 638 are provided in pairs for cooperation with the short terminals 625.

Figure 44:
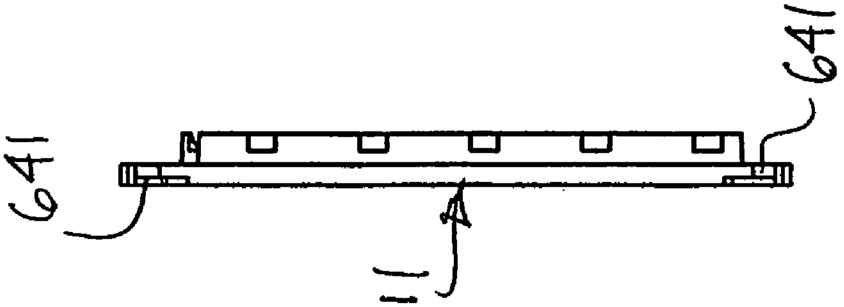
FIG. 44 is an end view of the housing cover.
Figure 43:
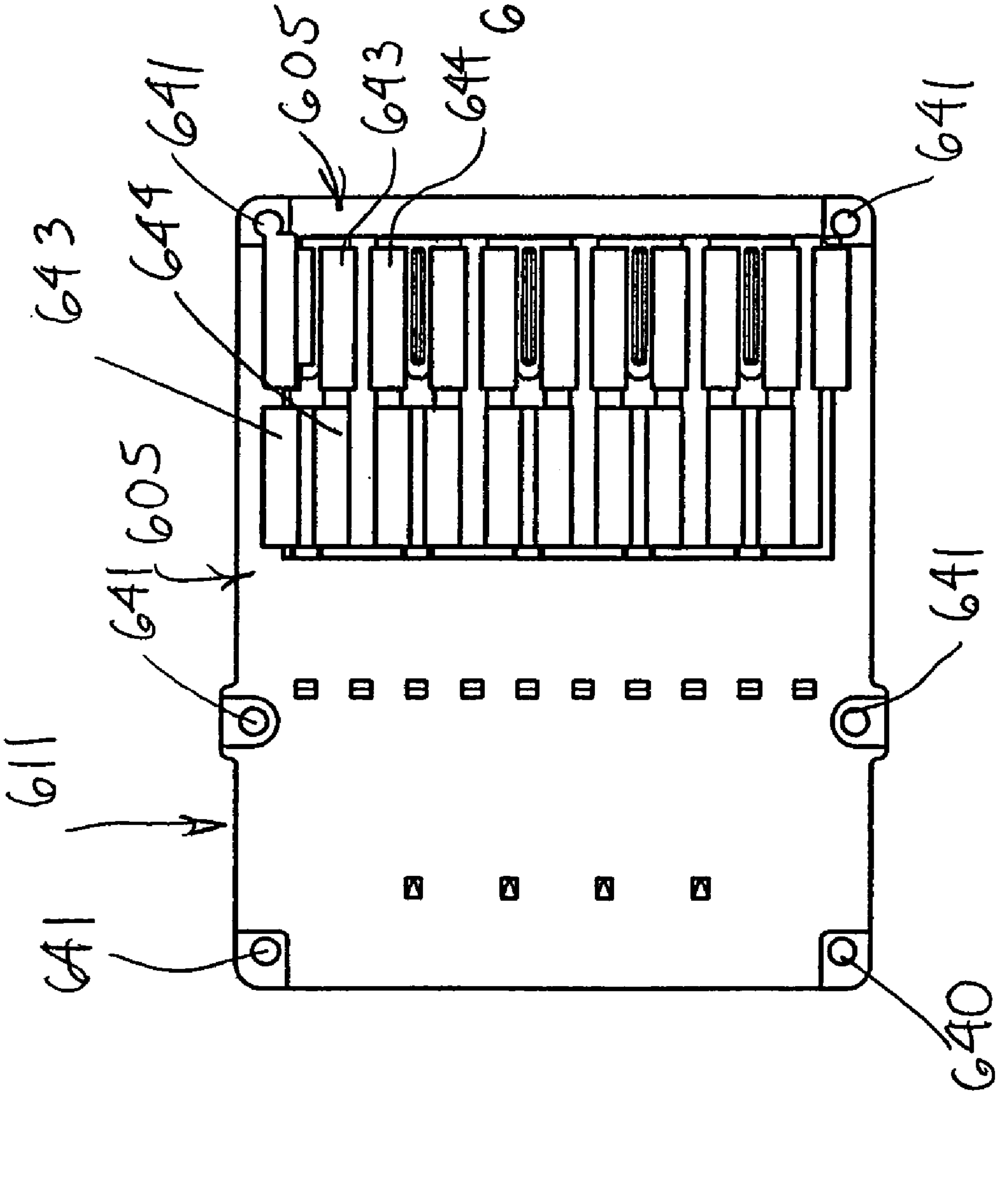
FIG. 43 is an inside view of the housing cover.

To secure the cover 611 in place, the plug housing 610 also includes connector posts 640 about the periphery thereof which project upwardly and project through the cover 611. Referring more particularly to FIGS. 43 and 44, the cover 611 includes corresponding connector bores 641 through which they post 640 are received. The posts 640 may then be mechanically deformed such as by heat-staking or cold forming to secure the cover 611 fixedly on the housing 610.

The housing 611 includes the above-identified post openings 605 therethrough which openings 605 are defined by rectangular opening halves 643 and 644. These opening halves 643 and 644 thereby permit access to the terminal barrels 631 and 632 of the respective terminals 625 or 626.

Figure 51:
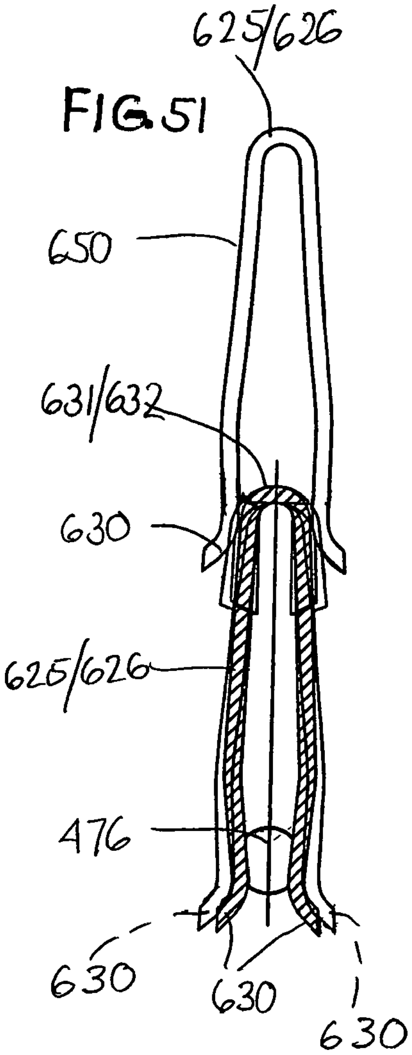
FIG. 51 is an end cross sectional view of the terminals diagrammatically illustrating a PDA conductor inserted therein as well as a further terminal engaged therewith.

Referring to FIG. 51, a representative cross section of either of the terminals 625 or 626 is illustrated with the contact fingers 630 projecting downwardly therefrom. These contact fingers 630 are illustrated in an initial undeflected position as indicated by the cross-hatching. However, when the plugs 606 are inserted into the respective openings of the PDA's described above, these fingers 630 are deflected outwardly by the PDA conductor such as conductor 476 to the condition identified by phantom outline reference lines 630. Initially, even when the plugs 601 or 602 are engaged with a respective PDA, an additional system component may be engaged thereto through the openings 605. Hence, FIG. 51 illustrates an additional contact 625 or 626 engaged therewith as indicated in the position 650 wherein the contact fingers 630 engage the respective terminal barrel 631 or 632. In this manner, the system components may be stacked one on top of the other since these plugs 601 and 602 include both male connectors and female connectors.

Figure 45:
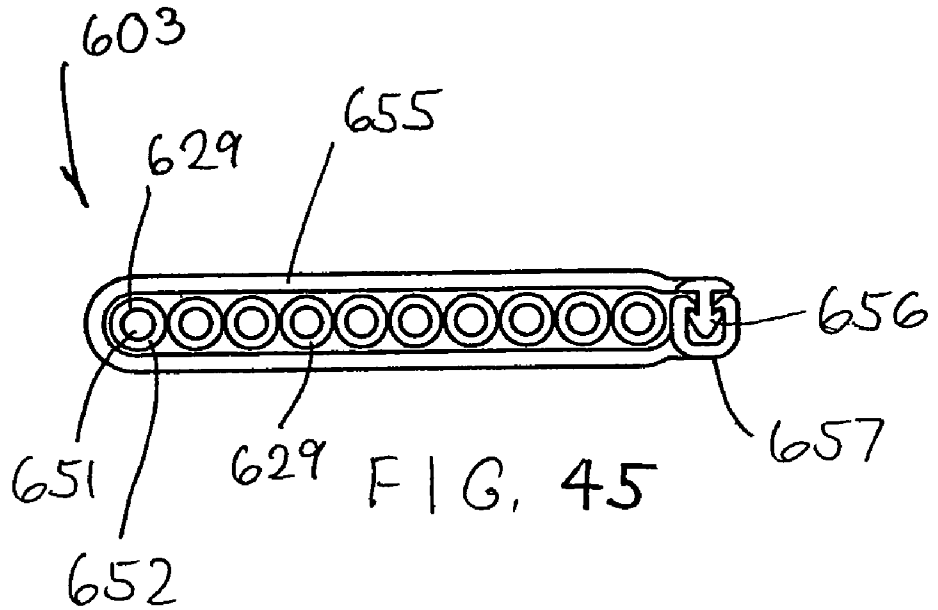
FIG. 45 is an end view of a conductor body for the flex connector having a foldable cable carrier or sleeve.

More particularly as to FIGS. 39 and 45–47, the conductor body 603 includes a plurality of individual conductor wires 629 extending longitudinally therethrough that are each engaged with a respective one of the terminals 625 or 626 at each opposite end. In this regard, FIG. 45 illustrates a plurality of such wires 629 which are each defined as having an interior conductor 651 surrounded by a wire sheath 652. Individual wires 629 are each connected to a respective pair of such terminals 625 or 626 and then arranged in a bore as illustrated in FIG. 45.

An outer wire carrier 655 is provided as a foldable enclosure having a snap-fit rib 656 extending along one edge thereof and a corresponding groove 657 along the other edge there which engage within each other as seen in FIG. 45. Thus, this cable carrier 655 may be folded over the wires 629 and then snapped to a closed position.

Figure 46:
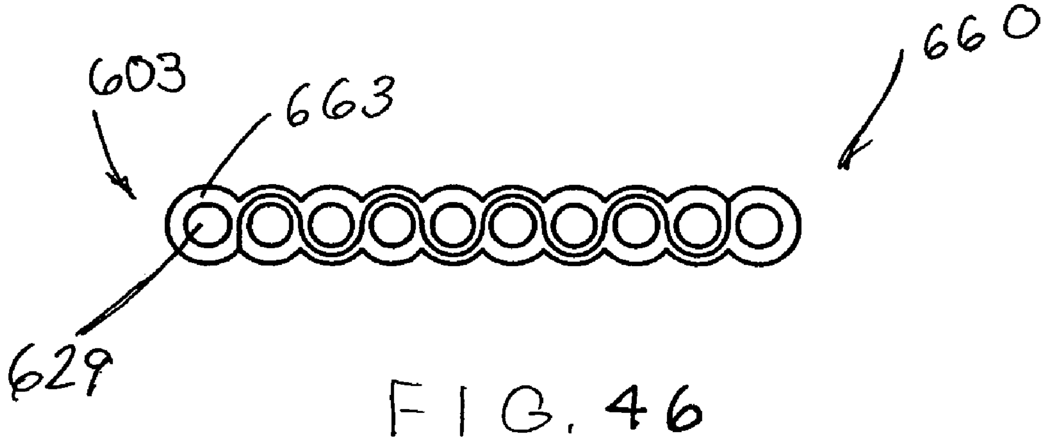
FIG. 46 is an end view of a festoon conductor body having interfitting festoon sections.
Figure 47:
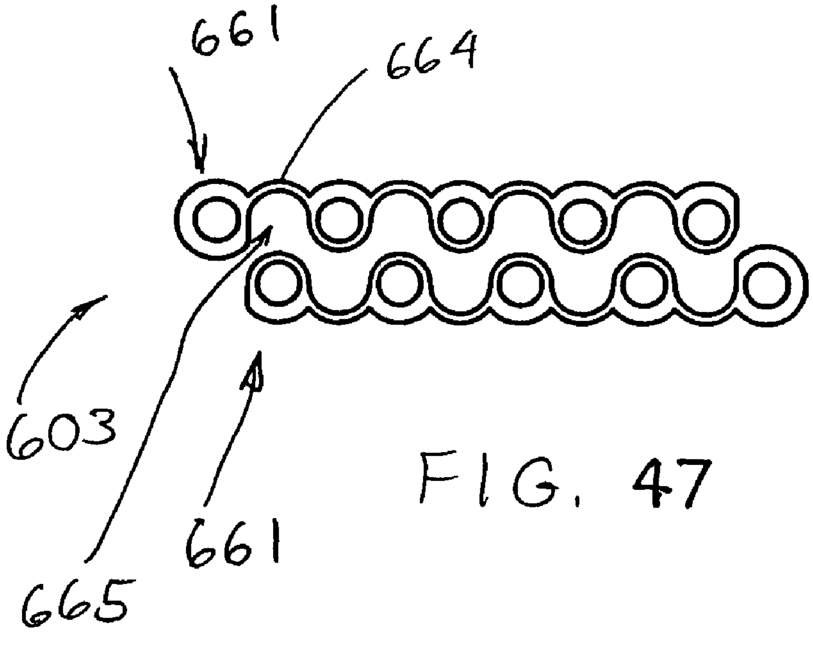
FIG. 47 is an exploded view of the festoon conductor body.

Referring to FIGS. 46 and 47, the conductor body 603 alternatively may be formed with a festoon configuration. This festoon cable 660 is formed from two cable sections 661 which are formed identical to each other but are inverted in opposing relation as seen in FIG. 47 so as to be mated together to define the festoon cable assembly illustrated in FIG. 46. Each cable section 661 has a plurality of spaced apart conductor wires 662 extending along the longitudinally length thereof which are enclosed or over molded by molded plastic 663 as an insulator. Each wire 662 is joined by a thin intermediate wall 664 which thereby defines a wire-receiving groove 665 therein. A plurality of such grooves 665 are provided which are each adapted to tightly receive a corresponding wire of the other cable section 661 as seen in FIGS. 46 and 47. As such, the cable sections 661 are first sidewardly offset as seen in FIG. 47 and then tight fittingly engaged together as seen in FIG. 46. When engaged together, the wires 662 have free ends which extend outwardly from the plastic over molded material as seen generally in FIG. 39 so that the free end of the wire 629 may be secured to a respective one of the terminals 625 and 626. As such, each of the wires 629 projects outwardly of the outer insulative layer 663 or the carrier 655 wherein the opposite free ends of each wire each have a respective terminal 625 or 626 fixedly secured thereto to define an electrical connection therebetween.

During the assembly process, the cable section 603 has its opposite ends threaded inwardly into the plug housings 610 as seen in FIG. 39 and then the cover 611 is secured thereto to effectively clamp the end of the cable carrier 603 to define a rigidly interconnected assembly of the plugs 601 and 602 and the conductor carrier 603.

As such, the above-described plug connector 601 is assembled and is useable with the above-described PDA's for 470, 500 and 530.

Referring to FIGS. 52–59, a method for assembling flex connectors such as flex connector 600 is illustrated. Generally, the manufacturing process of the invention is diagrammatically depicted by the flow chart of FIG. 52. During this process the first steps involves supplying stock cable to define the festoon cable sections 661 which are joinable together to define the festoon cable 660. In the next step 702, insulation is stripped from the festoon cables to expose the internal conductor wires and specifically, the interior electrical conductors thereto. The electrical conductors may be formed of braided wire wherein the terminal end of such braided wire is welded in step 703 to define an integral welded wiring bundle. In step 704, either a short electrical terminal 625 or a long electrical terminal 626 is then welded to the welded wire bundle to define a wire assembly. In step 705, the two festoon cable section 661 are then interfitted or press-fit together to define the flexible conductor body 603, after which, in step 706, the terminals 625 and 626 are fitted into the flex connector housing 610–611 which thereby defines the plug 601 or the opposite plug 602 of the flex connector 600.

Figure 53:
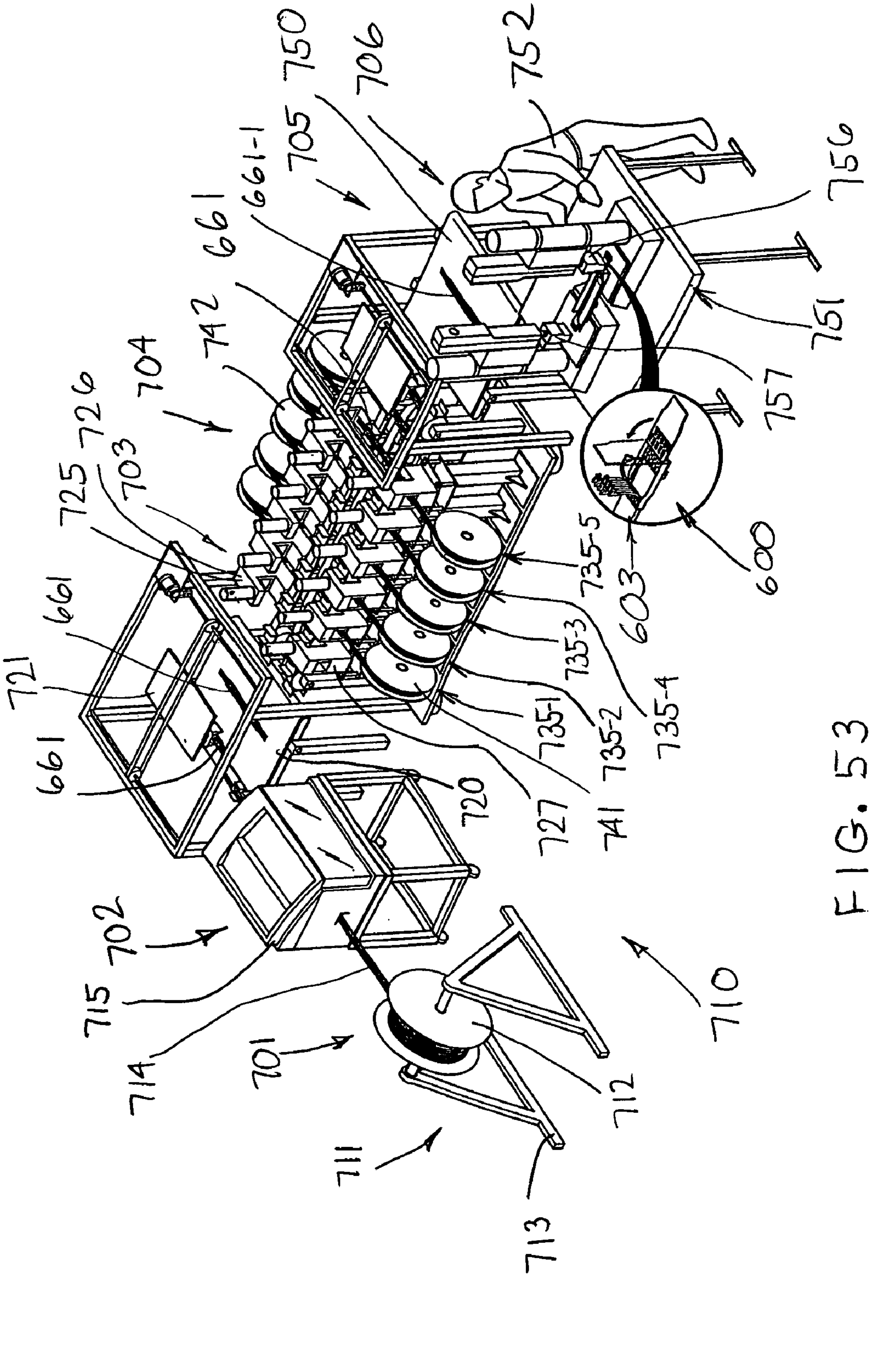
FIG. 53 is an isometric view of a first assembly machine for this process.

More particularly as to the process, FIG. 53 illustrates a first assembly machine 710 which is configured for the above-described assembly process wherein the process steps are performed in a combination of automatic and manual steps.

As to the assembly machine 710, this assembly machine 710 includes a wire supply 711 which comprises a wiring spool 712 rotatably mounted on a support frame 713. The spool 712 includes a continuous length of cable stock 714. This cable stock 714 is a continuous length of festoon cable which has the same profile and is cut to length to define the individual festoon cable sections 661.

Figure 56:
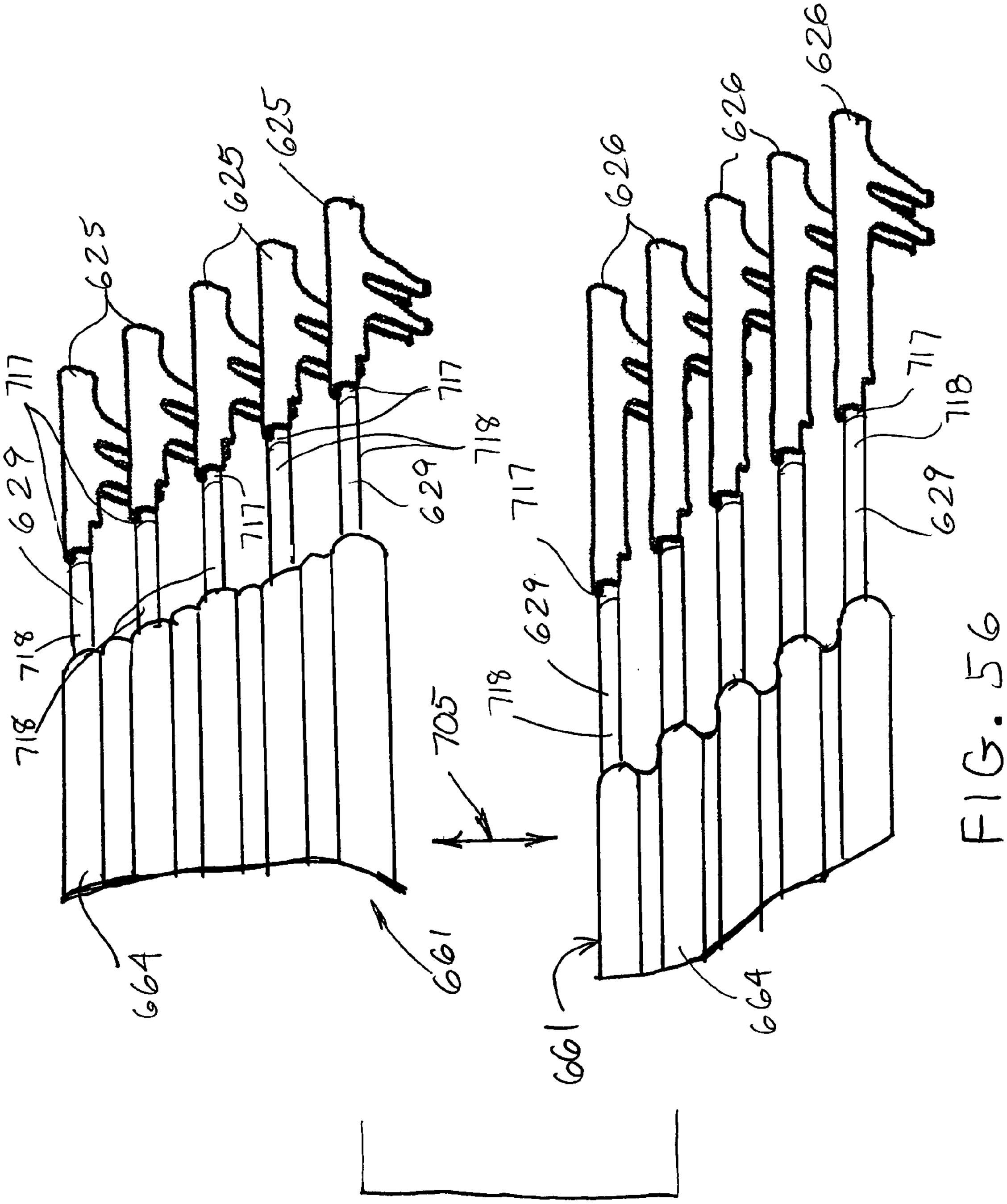
FIG. 56 is an isometric view of a corresponding pair of festoon cable sections with electrical terminals joined thereto.

This festoon cable stock 714 passes into a stripping and cutting machine 715 in which, the cable stock 714 is cut to length to define the individual festoon cable sections 661. Additionally within the machine 715, each opposite end of the festoon cable section 661 is stripped of the outer insulative material 664 as seen in FIG. 56 so as to leave the individual conductor wires 629 exposed on each opposite end of the festoon cable section 661. Each individual conductor wire 629 comprises an interior core 717 of an electrical conductor which is surrounded by an outer insulative sheath 718. In the stripping and cutting machine 715, a preferred length of approximately 2 inches of each conductor wire 629 is exposed with approximately ⅜ of an inch of the inner conductive core 717 being exposed by removal of the outer insulative sheath 718 therefrom.

Figure 57:
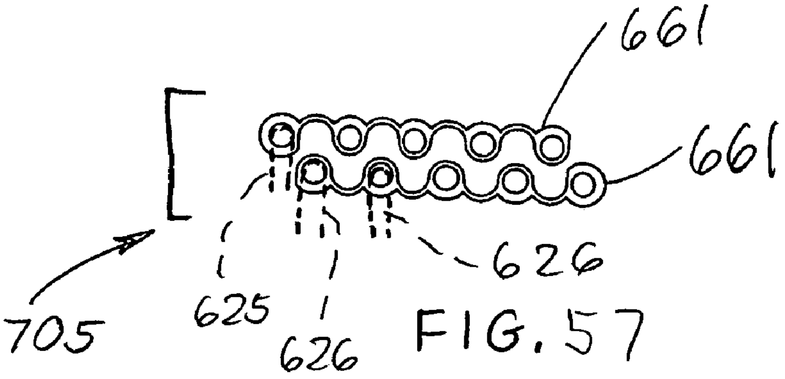
FIG. 57 is an end view of the festoon cable sections prior to being interfitted together.

Each festoon cable section 661 are then discharged one at a time from the machine 715 to a support table 720. As the cable sections 661 are discharged to the table 720, it is noted that these festoon cable sections all have the same orientation with the grooves 665 thereof facing, either upwardly or downwardly in the same direction. However, for assembly, these cable section 661 face in opposite directions as seen in FIG. 57 so that their respective grooves may interfit and mate together. Thus, a gripping and flipping unit 721 is provided which grips every other cable section 661 and flips same so that the festoon cable section 661 are in alternating orientations on the table 720 for subsequent assembly.

Figure 55A:
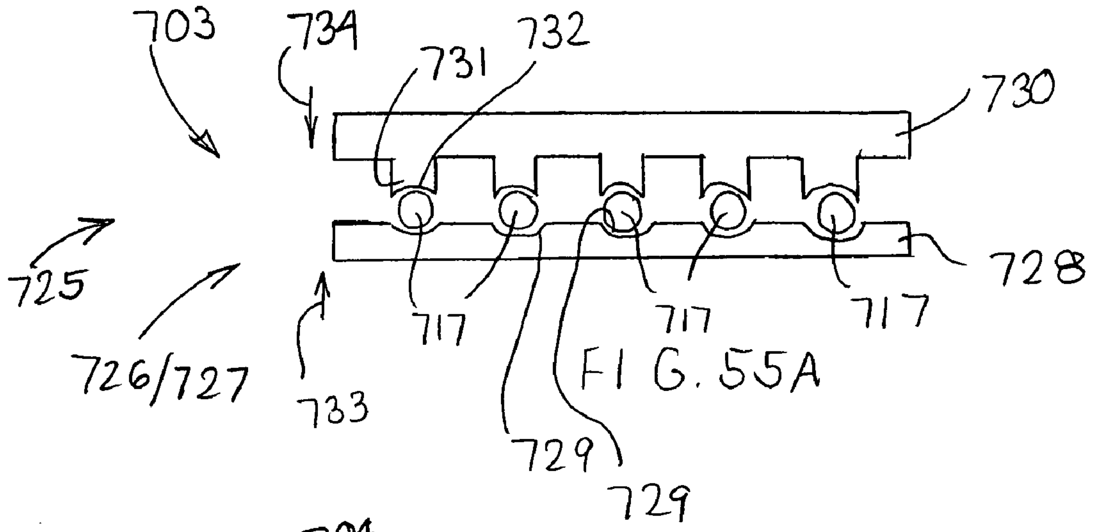
FIG. 55A is a diagrammatic view of a wire welder for welding terminal ends of conductor wires.

In step 703, the individual cable sections 661 are then passed to a wire welder 725 which is defined by a first weld unit 726 and a second weld unit 727 which are located on opposite sides of the post path along which the cable sections 661 travel. Each weld unit 725 and 726 is configured to weld the pre-exposed ends 717 of each conductor wire 629. Referring to FIG. 55A, each weld unit 725 and 726 comprises a lower weld plate 728 which includes five concave grooves 729 therein. It is noted that each festoon cable section includes five conductor wires 629 wherein the cable sections 661 when mated (FIG. 58) result in a sum total of 10 conductor wires. Each cable section 661 is passed one at a time to the wire welder 725 for finishing of the wire conductor ends 717.

The function of the wire welder is to integrally join all of the strands of the exposed conductor end 717 together through a weld process. In this regard, the conductor sections 717 are each adapted to align with and seat within a respective one of the lower grooves 729.

The wire welder 725 also includes an upper weld plate 730 which includes five weld projections 731 that have respective concave grooves 732 that are adapted to press downwardly against the conductor end 717. During the weld operation by the wire welder 725, the lower plate 728 is first moved upwardly in the direction of reference arrow 733 against the conductor wire 717 and then the upper plate is moved downwardly as indicated by reference 734. With the conductor end 717 being confined between the opposed grooves 729 and 732, both welders 726 and 727 are then activated to apply a weld to each of the conductor ends in 717 and bind any individual strands thereof together into a single mass or bundle.

Figure 55B:
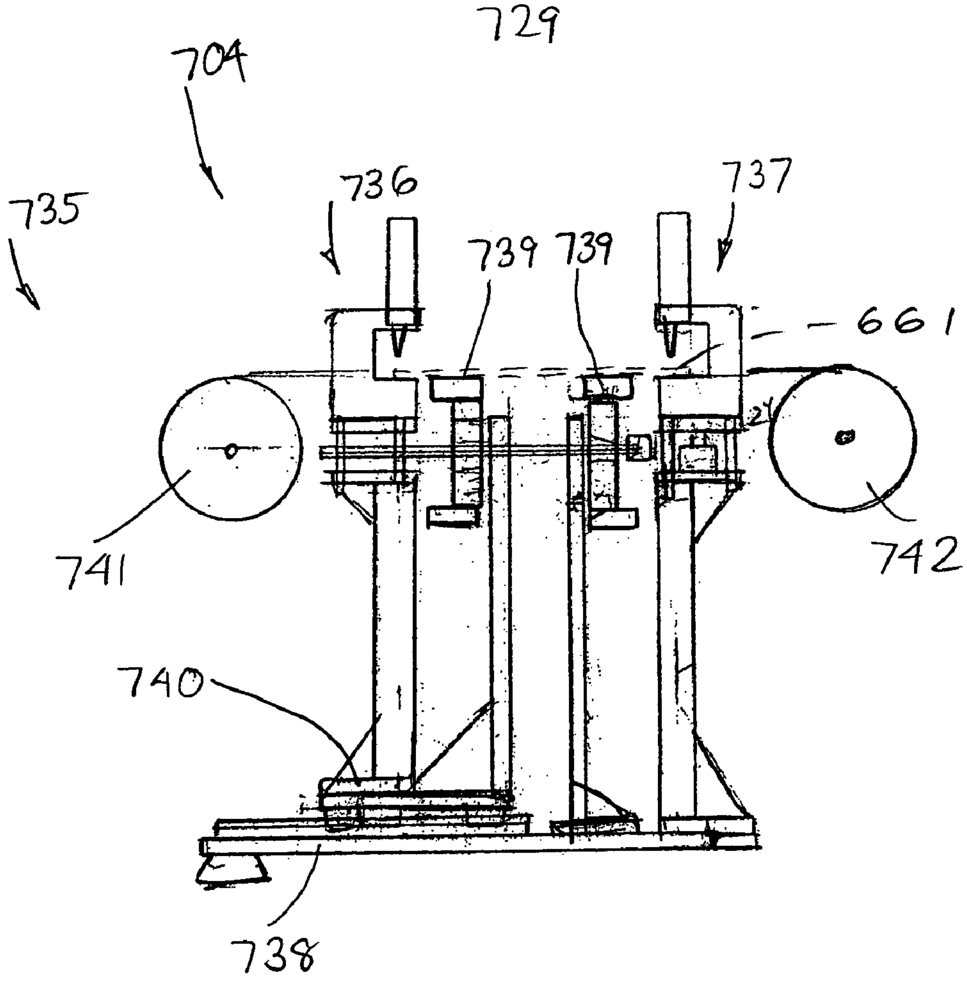
FIG. 55B is an end view of one weld assembly for either machine of FIGS. 53 and 54.

In step 704, the cable section 661 is then moved incrementally through five separate weld stations 735. Referring to FIG. 55B, each weld station 735 comprises two weld units 736 and 737 which are spaced apart and supported on a base frame 738. The weld station 735 includes a pair of support rails 739 which support the cable section 661 as they pass along each of the weld stations 735 as the post moves through the path extending therebetween. It is noted that the weld station 737 is in a fixed position while the weld station 736 has a mobile base 740 that allows for the adjustment of the distance between the two weld units 736 and 737 to accommodate different lengths of the cable sections 661. Each weld unit 736 and 737 includes an associated spool 741 and 742 on which is provided a supply of terminals 625 and 626. In particular, the supply of terminals 741 has a main longitudinal web which has a plurality of spaced apart terminals 625 and 626 removeably supported thereon similar to a nail gun which uses a similar supply arrangement. These terminal supply spools 741 and 742 thereby provide a terminal 625 or 626 one at a time to each weld unit 736 and 737. Generally, the weld unit 736 and 737 are actuated simultaneously to engage one terminal to each opposite end of a conductor wire 629 extending through a cable section 661.

Hence, in the first weld station 735-1, the respective weld units 736 and 737 are actuated to weld a terminal 625 or 626 to the conductor end 717 so as to be joined together as seen in FIG. 56. Once appropriate terminals 625 or 626 are joined to the first conductor wire in the first weld station 735-1, the cable section 661 is then incrementally displaced to the next station 735-2 wherein appropriate terminals 625 or 626 are joined to the second conductor wire 629. Thereafter, the cable section 661 is then shifted to the third weld station 735-3 and then to the subsequent stations until all five conductor wires 629 in a cable section 661 have one terminal 625 or 626 joined to each conductor end 717.

Figure 58:
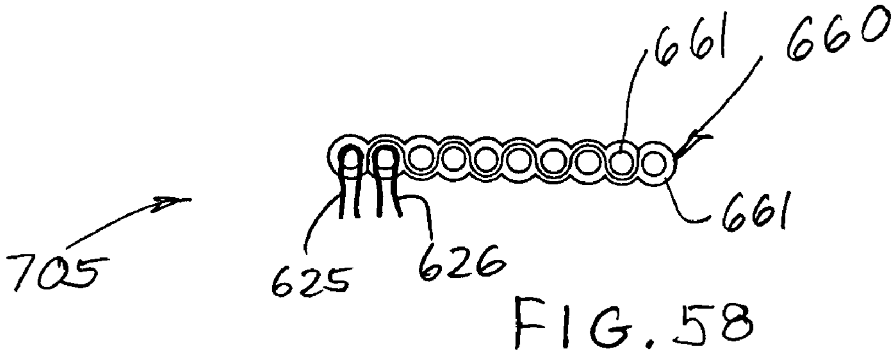
FIG. 58 is an end view of the assembled festoon cable sections.

As a result, a cable section assembly such as those illustrated in FIG. 56 are discharged one at a time from the welding step 704 and positioned on the assembly table 750. In step 705, the two festoon cable sections are first aligned in step 705 as seen in FIG. 57 and then pressed together as seen in FIG. 58.

Figure 59:
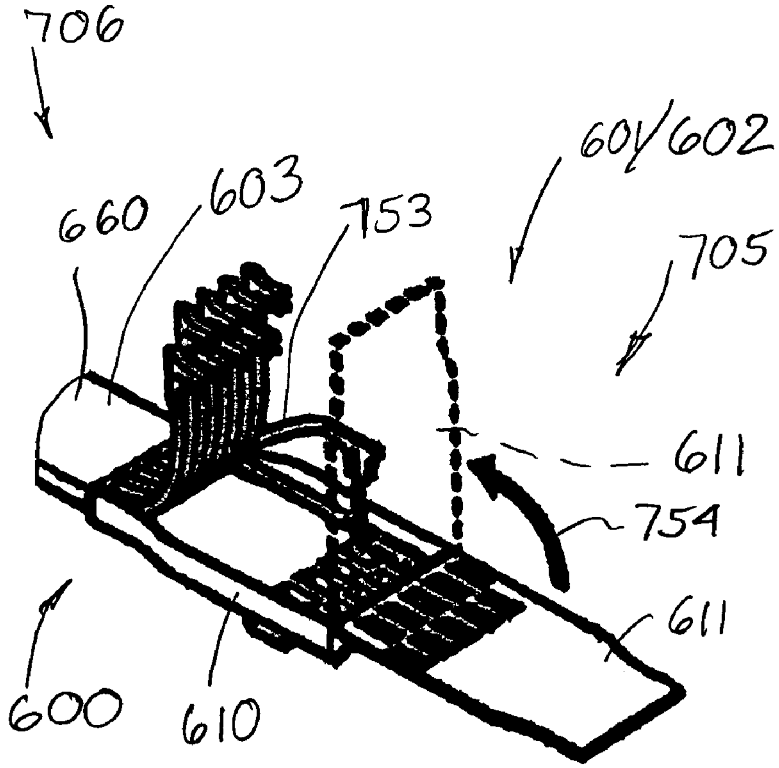
FIG. 59 is an isometric view diagrammatically illustrating the attachment of the festoon cable with a plug housing.

Thereafter, this cable assembly is then manually transferred to the assembly station 751 where an operator 752 manually positions the opposite ends of the festoon cable section within an appropriate housing 610 as seen in FIG. 59. The operator manually positions each terminal 625 or 626 into an opening as indicated by the conductor wire shown in the insertion position identified by reference arrow 753 in FIG. 59. Each of the terminals 625 and 626 is inserted into the appropriate opening and then the cover 611 is positioned to overlie the housing as indicated by reference arrow 754. The respective 610 and cover 611 are each provided within a respective fixing unit 756 and 757 to thereby fixedly secure the cover 611 to the housing 610 and enclose the terminals 625 and 626 within this housing 610 to thereby define the assembled plug 601 or 602.

In this manner, an improved process is provided for assemblying these components and specifically attaching electrical terminals to the free ends of internal conductor wires.

Figure 52:
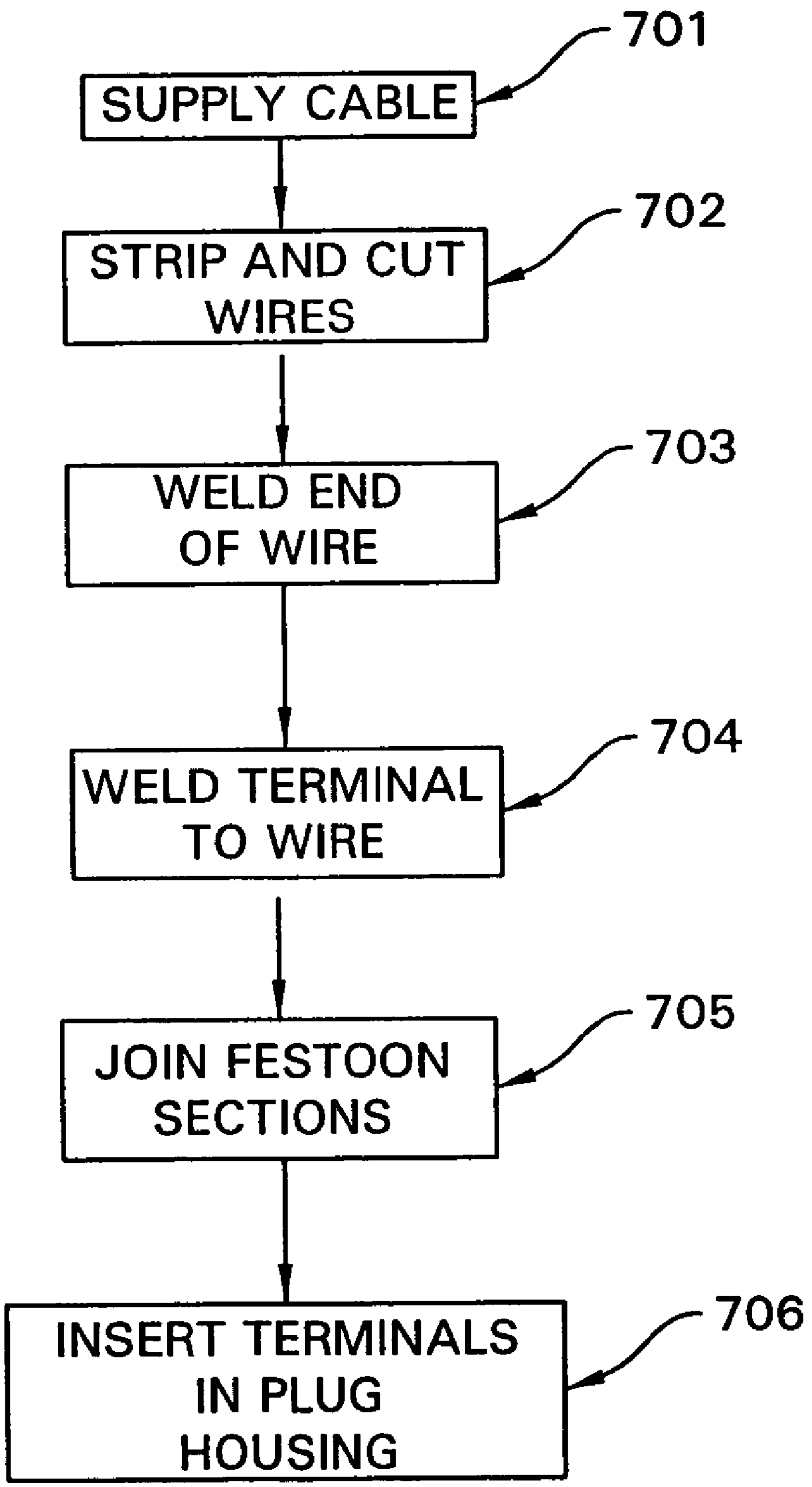
FIG. 52 is a flow chart of a manufacturing process for assembling a flex connector.
Figure 54:
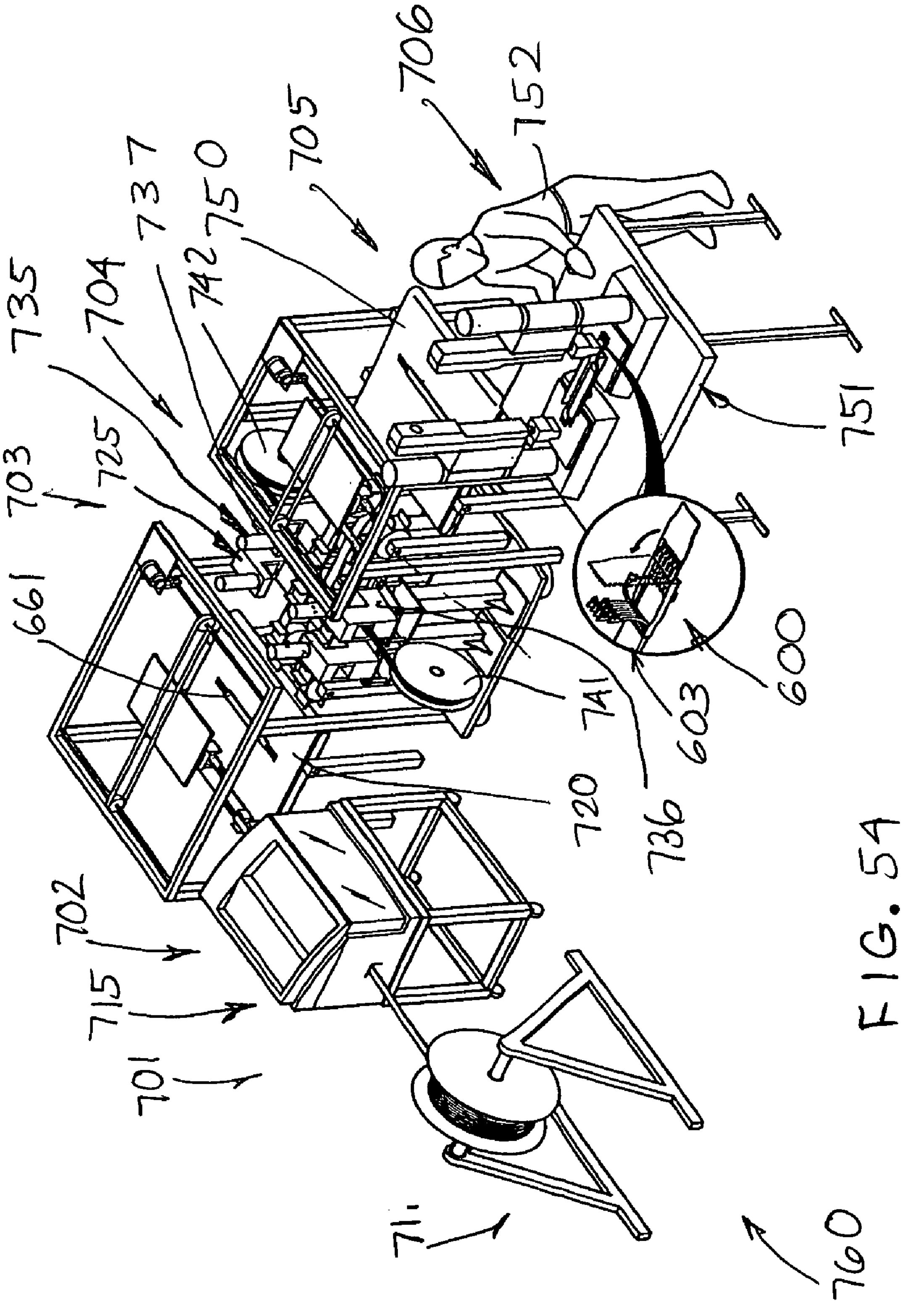
FIG. 54 is an isometric view of an alternative second assembly machine for this process.

Referring to FIG. 54, a similar machine 760 is illustrated which includes substantially the same components including a wire supply 711 and a cutting and stripping machine 715, a repositioning table 720, a wire welder 725, a welding station 735, an assembly table 750 and a further weld station 751 which is manually operated by an operator 752. The primary distinction in this machine 760 versus the machine 710 is the provision of only one weld station 735. This weld station 735 includes the same components as illustrated in FIG. 55B. However, only the single station 735 is provided wherein this single station first provides the terminals 625 or 626 on the first wire 629 wherein the cable section 661 is then incrementally displaced a small distance so that the same station 735 and the weld units 736 and 737 thereof may be used to weld additional terminals to the second wire. Thereafter, the cable section 661 is again displaced a small distance to permit fastening of terminals 625 or 626 to the third wire 629, the fourth wire 629 and the fifth wire 629 of each cable section 661. Thus, the same assembly process is followed as illustrated in FIG. 52 except that a single weld station 735 is provided.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A manufacturing process for assembling a flexible electrical conductor having a flat multi-wire intermediate cable defined by one or more cable sections and having plugs at opposite ends thereof, the method comprising the steps of:

providing a flat cable section having an outer insulative covering and internal parallel conductor wires which project outwardly of said covering;

providing a supply of electrical terminals which are configured to be positioned within said plug and connect to a respective end of a respective one of said wires;

providing at least one weld station comprising a pair of weld units configured to weld said terminals to said wire ends;

operating said weld station to weld one said terminal to said respective wire end;

incrementally displacing said cable section and welding further said terminals to another of said wires and repeating said displacement and welding process to weld one said terminal to each of said wire ends; and positioning said cable section and said attached terminals within a housing of said plug and fixedly securing said housing to said cable section with said terminals disposed in side by side relation within said plug for engagement with a current-carrying electrical component.

2. The method according to claim 1, wherein said pair of weld units are positioned in alignment with each opposite end of one said wire wherein said weld units are operated simultaneously to weld one said terminal to each of said opposite ends of said wire.

3. The method according to claim 2, wherein a plurality of said weld stations are provided and the method includes the step of incrementally displacing said cable section successively from one said weld station to another said weld station for successive welding of said terminals to said opposite ends of each successive one of said wires.

4. The method according to claim 2, wherein one said weld station is provided and said cable section is displaced within said weld station before simultaneously connecting said terminals to each of said opposite ends of each said wire and successively applying additional said terminals to next successive ones of said wires.

5. The method according to claim 1, wherein said process includes the steps of providing a wire weld station which includes a pair of wire weld units configured for alignment with each opposite end of said cable section, said wire weld unit applying a weld to each opposite end of each said wire to solidify said wire ends.

6. The method according to claim 5, wherein said cable sections are formed as festoon cable sections comprising one half of the total of said wires wherein two said cable sections are interfitted together in opposing relation to define the total plurality of said wires in side by side relation.

7. The method according to claim 6, wherein the method includes the steps of welding said terminals to said wire ends with said festoon cable sections disposed in opposite orientations and then mating and interfitting said festoon cable sections together.

8. A manufacturing process for assembling a flexible electrical conductor having a flat multi-wire intermediate cable defined by one or more cable sections and having plugs at opposite ends thereof, the method comprising the steps of:

providing a flat cable section having an outer insulative covering and internal parallel conductor wires which each have opposite ends that project outwardly of said covering, a plurality of said wires being provided which define a plurality of circuits comprising hot and neutral wires and at least one associated ground wire, said wires being disposed in side by side relation;

providing a supply of electrical terminals which are configured to be positioned within a housing of said plug in side by side relation and connect to a respective end of a respective one of said wires;

providing at least one weld station comprising a pair of weld units configured to weld said terminals to said wire ends;

operating said weld station to weld one said terminal to said respective wire end wherein said terminals at said opposite ends of said wire are welded simultaneously;

incrementally displacing said cable section and said weld station relative to each other and welding further said terminals to another of said wires and repeating said displacement and welding process to weld one said terminal to each of said wire ends; and positioning said cable section and said attached terminals within a housing of said plug and fixedly securing said housing to said cable section with said terminals disposed in side by side relation within said plug for engagement with a current-carrying electrical component.

9. The method according to claim 8, including the steps of cutting said cable section from a supply of flat cabling, and stripping said insulative cover from said wires to expose said wire ends.

10. The method according to claim 9, wherein said cable sections have mating sides which are configured to join two opposing cable sections together, said mating sides of successive cable sections being oriented to face in opposite first and second directions.

11. The method according to claim 10, wherein said terminals project in a direction transverse to a longitudinal axis of said wires, said terminals on each successive one of said cable section projecting in said first direction, wherein the mating side of one said cable section faces in said first direction and the mating side of the next successive cable section faces in said second direction.

12. The method according to claim 11, which includes the step of positioning said mating sides of two successive cable sections in opposing overlying relation and pressing said cable sections together in interfitting relation to define said intermediate cable.

13. The method according to claim 12, wherein said wires of said two interfitted cable sections lie in substantially a common plane.

14. The method according to claim 8, wherein one said weld station is provided for each said wire, the method including the step of incrementally displacing said cable section successively from one said weld station to another said weld station for successive welding of said terminals to said opposite ends of each successive one of said wires.

15. The method according to claim 8, wherein one said weld station is provided for joining said terminals to each said wire, said method including the step of displacing said cable section within said weld station before simultaneously connecting said terminals to each of said opposite ends of each said wire and successively applying additional said terminals to next successive ones of said wires.

16. A manufacturing process for assembling a flexible electrical conductor having a flat multi-wire intermediate cable defined by one or more cable sections and having plugs at opposite ends thereof, the method comprising the steps of:

providing a flat cable section having an outer insulative covering and internal parallel conductor wires which each have opposite ends that project outwardly of said covering, a plurality of said wires being provided which define a plurality of circuits comprising hot and neutral wires and at least one associated ground wire, said wires being disposed in side by side relation, said providing step including the steps of cutting said cable section from a supply of flat cabling, and stripping said insulative covering from said wires to expose said wire ends;

providing a wire weld station which includes a pair of wire weld units configured for alignment with each opposite end of said cable section, said wire weld unit applying a weld to each opposite end of each said wire to solidify said wire ends;

providing a supply of electrical terminals which are configured to be positioned within a housing of said plug in side by side relation and connect to a respective end of a respective one of said wires;

providing at least one terminal weld station comprising a pair of weld units configured to weld said terminals to said solidified wire ends;

operating said terminal weld station to weld one said terminal to said respective wire end wherein said terminals at said opposite ends of said wire are welded simultaneously;

incrementally displacing said cable section and said weld station relative to each other and welding further said terminals to another of said wires and repeating said displacement and welding process to weld one said terminal to each of said wire ends; and positioning said cable section and said attached terminals within a housing of said plug and fixedly securing said housing to said cable section with said terminals disposed in side by side relation within said plug for engagement with a current-carrying electrical component.

17. The method according to claim 16, wherein one said terminal weld station is provided for each said wire, the method including the step of incrementally displacing said cable section successively from one said terminal weld station to another said terminal weld station for successive welding of said terminals to said opposite ends of each successive one of said wires.

18. The method according to claim 16, wherein one said terminal weld station is provided for joining said terminals to each said wire, said method including the step of displacing said cable section within said terminal weld station before simultaneously connecting said terminals to each of said opposite ends of each said wire and successively applying additional said terminals to next successive ones of said wires.

19. The method according to claim 16, wherein said cable sections are formed as festoon cable sections comprising one half of the total of said wires wherein two said cable sections are interfitted together in opposing relation to define the total plurality of said wires in side by side relation.

20. The method according to claim 19, wherein the method includes the steps of welding said terminals to said wire ends with said festoon cable sections disposed in opposite orientations and then mating and interfitting said festoon cable sections together.

* * * * *